United States Patent
Moncrief, III et al.

(10) Patent No.: US 8,540,457 B2
(45) Date of Patent: Sep. 24, 2013

(54) SYSTEMS, METHODS AND PROCESSES FOR USE IN PROVIDING REMEDIATION OF CONTAMINATED GROUNDWATER AND/OR SOIL

(75) Inventors: Charles R. Moncrief, III, Arroyo Grande, CA (US); Bryan Childress, Arroyo Grande, CA (US); Art Wyrick, Bodfish, CA (US)

(73) Assignee: Clean Liquid, LLC, San Luis Obispo, CA (US)

( * ) Notice: Subject to any disclaimer, the term of this patent is extended or adjusted under 35 U.S.C. 154(b) by 591 days.

(21) Appl. No.: 12/705,440

(22) Filed: Feb. 12, 2010

(65) Prior Publication Data

US 2011/0200392 A1 Aug. 18, 2011

(51) Int. Cl.
*B09C 1/00* (2006.01)

(52) U.S. Cl.
USPC .................................. 405/128.75

(58) Field of Classification Search
USPC .............................. 405/128.5, 128.25, 128.75
See application file for complete search history.

(56) References Cited

U.S. PATENT DOCUMENTS

| | | | | |
|---|---|---|---|---|
| 4,732,597 | A * | 3/1988 | Jujasz et al. | 62/652 |
| 4,849,360 | A * | 7/1989 | Norris et al. | 435/264 |
| 5,874,001 | A | 2/1999 | Carter | |
| 6,284,143 | B1 | 9/2001 | Kerfoot | |
| 6,780,331 | B2 * | 8/2004 | Galatro et al. | 210/747.8 |
| 7,264,419 | B2 * | 9/2007 | Bowman et al. | 405/128.75 |
| 7,326,002 | B2 * | 2/2008 | Kerfoot | 405/128.25 |

OTHER PUBLICATIONS www.h2oengineering.com, "Sparge Well Materials", www.h2oengineering.com/product_ancillary.html, Apr. 1, 2008 (7 pages).
H2O Enginnering, Inc., "The H2O Zone", Winter 2008 Newsletter, vol. 1, Issue 2, Nov. 1, 2008 (4 pages).
H20 Engineering, Inc., "Ozone Sparge Systems", www.h20engineering.com, Oct. 30, 2008 (2 pages).
H20 Engineering, Inc., "Oxygen Sparge Systems", www.h20engineering.com, Oct. 30, 2008 (2 pages).
H20 Engineering, Inc., "Combo Injection Units", www.h20engineering.com, Mar. 1, 2009 (2 pages).
H20 Engineering, Inc., "Ex-Situ Oxidation Systems", www.h20engineering.com, Jan. 30, 2009 (1 page).
H20 Engineering, Inc., "Liquid Injection Systems", www.h20engineering.com, Apr. 14, 2009 (1 page).
H20 Engineering, Inc., "Sparge Well Materials", www.h20engineering.com, Apr. 1, 2008 (1 page).
H20 Engineering, Inc., "Advanced Oxidation Sparge Units", www.h20engineering.com Mar. 1, 2009 (2 pages).

(Continued)

*Primary Examiner* — John Kreck
(74) *Attorney, Agent, or Firm* — Fitch, Even, Tabin & Flannery LLP

(57) ABSTRACT

The present embodiments provide methods, systems and processes for use in treating soil and/or ground water. Some of these embodiments provide systems for use in remediating contaminants, where the system comprises: a plurality of gas product sources positioned at a geographic location to be treated; a distribution manifold coupled with the plurality of product sources; a plurality of diffuser coupled with the distribution manifold and is positioned within separate wells within the soil; and a controller coupled with the plurality of product sources and the distribution manifold. The controller: activates one or more of the product sources to generate, locally at the geographic location, one of five different gas products in accordance with a first step of a treatment schedule; and communicates with the distribution manifold to direct the generated one of the five gas products to a predefined one of the diffuser.

6 Claims, 17 Drawing Sheets

(56) References Cited

OTHER PUBLICATIONS

H20 Engineering, Inc., "In Situ Oxidation Point (IOP) Sparge Well Installation Diagram", www.h20engineering.com, Apr. 2, 2008 (1 page).

Plummer et al, "Ozone Sparge Technology for Groundwater Remediation", www.h20engineering, printed Oct. 1, 2007 (19 pages).

\* cited by examiner

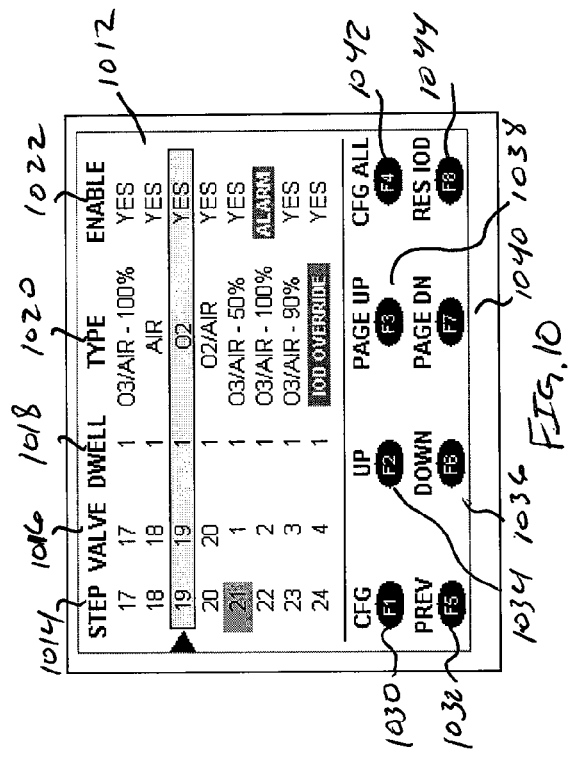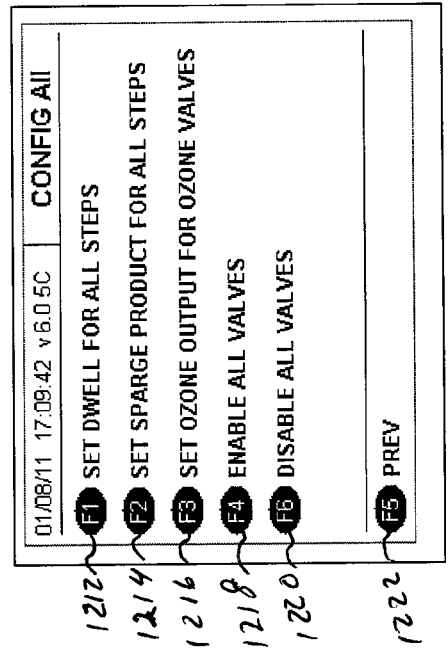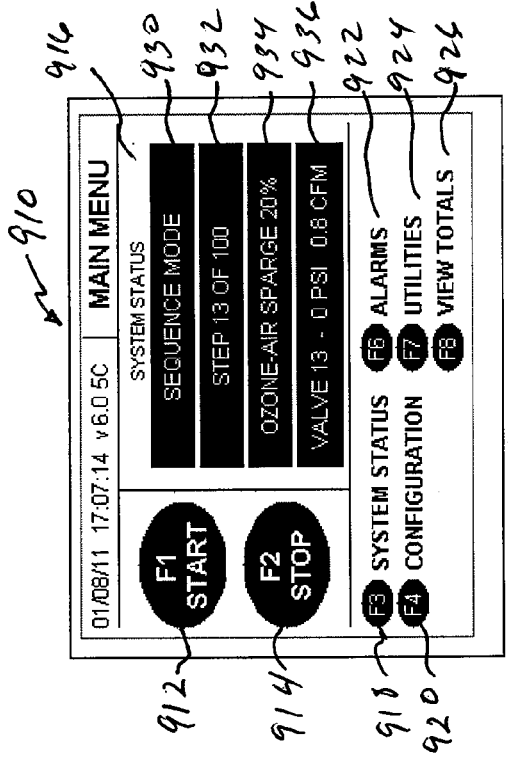
FIG. 10
FIG. 12
FIG. 9
FIG. 11

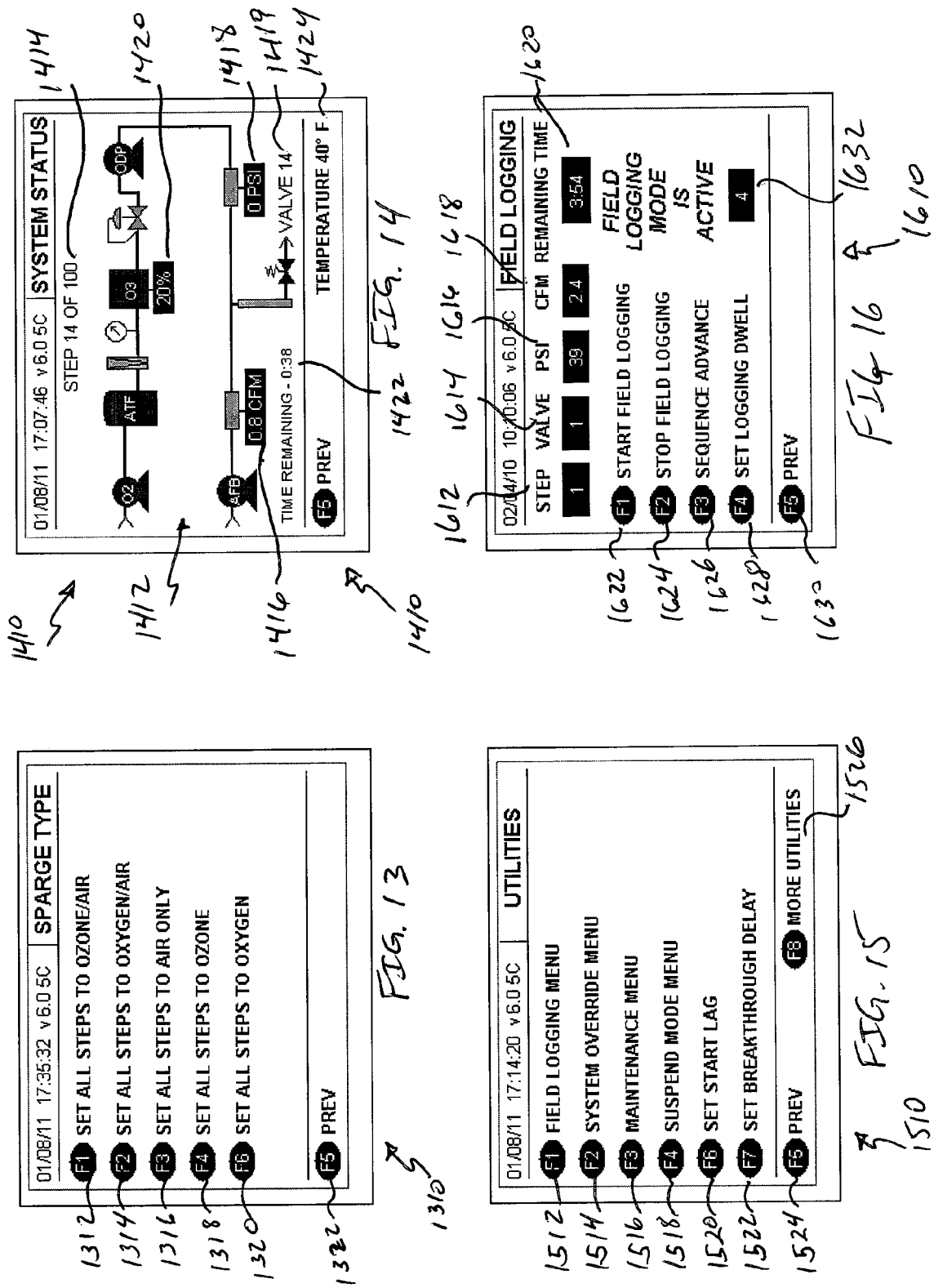

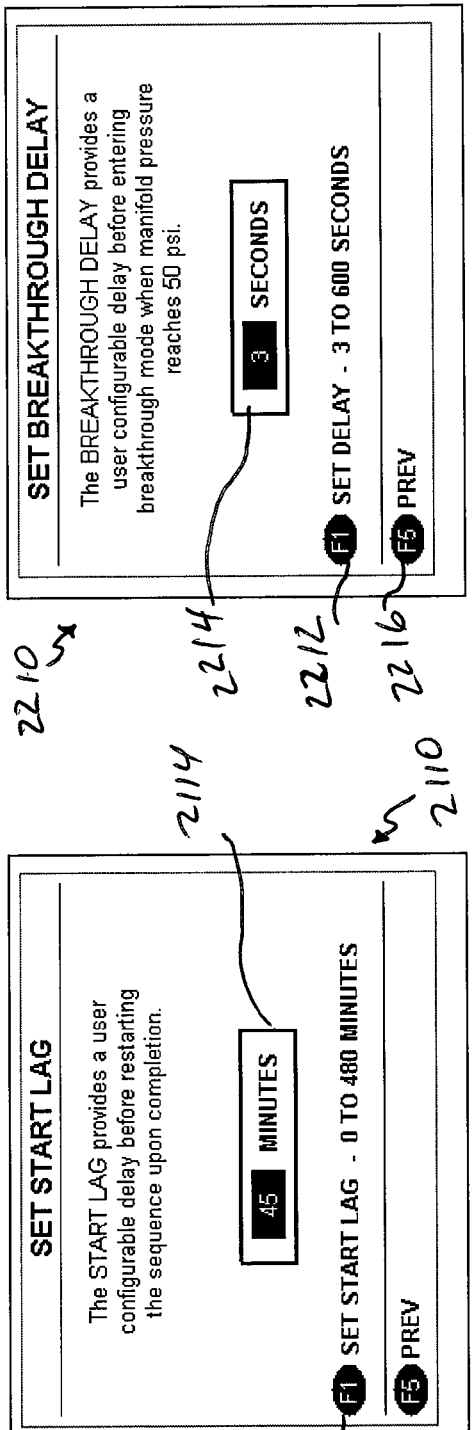
FIG. 21
FIG. 22
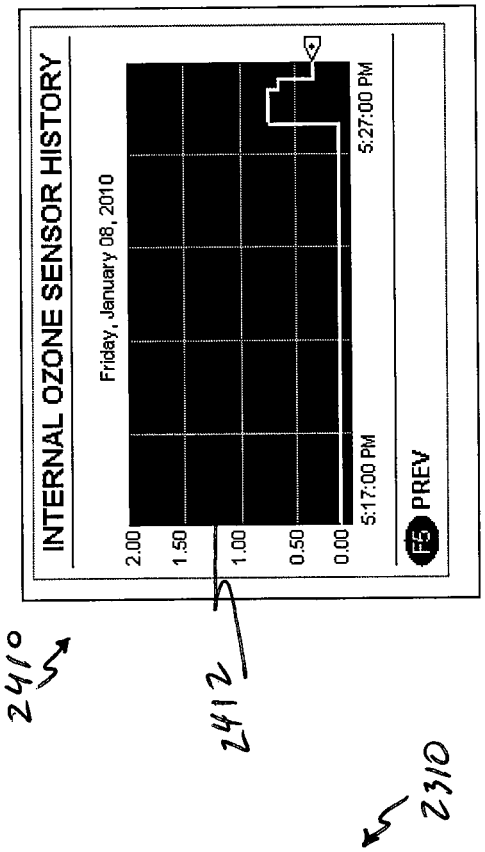
FIG. 24
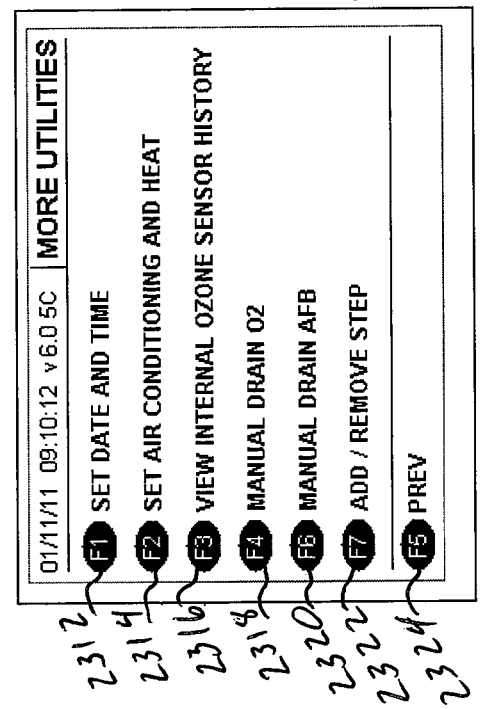
FIG. 23

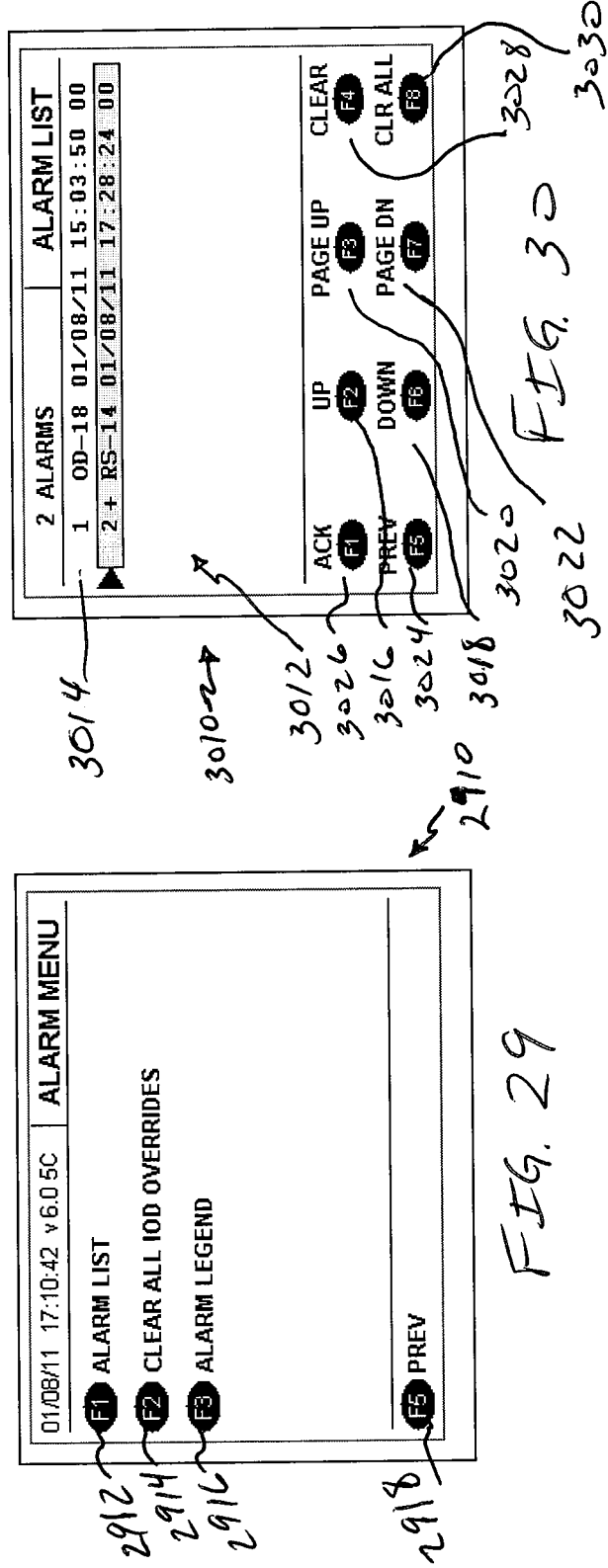

SYSTEMS, METHODS AND PROCESSES FOR USE IN PROVIDING REMEDIATION OF CONTAMINATED GROUNDWATER AND/OR SOIL

BACKGROUND

1. Field of the Invention

The present invention relates remediation, and more specifically to treating soil and/or groundwater 2. Discussion of the Related Art Contamination of subsurface soil and ground water by varying contaminants, such as petroleum and other industrial contaminants is a recurring problem. In addition, spills and improper disposal of contaminants, chemicals and pollutants is leading to large numbers of many contaminated sites. There is a growing need to effectively clean up these products and contaminated areas.

There are some techniques and systems that attempt to provide methods of cleaning these areas. Some of these techniques include air sparging and bioremediation. These techniques as implemented do date often are ineffective and/or can take extended amounts of time.

SUMMARY OF THE INVENTION

Several embodiments of the invention advantageously address the needs above as well as other needs by providing methods, systems and processes for use in treating soil and/or ground water. Some of these embodiments provide systems for use in remediating contaminants, where the system comprises: a plurality of gas product sources positioned at a geographic location to be treated; a distribution manifold coupled with the plurality of product sources; a plurality of diffuser coupled with and spaced over the distribution manifold, wherein each diffuser is positioned within a separate well within the soil proximate an area to be remediated; and a controller coupled with the plurality of product sources and the distribution manifold, wherein the controller: activates one or more of the product sources to generate, locally at the geographic location, one of five different gas products in accordance with a first step of a treatment schedule; and communicates with the distribution manifold to direct the one of the five gas products to a predefined one of the diffuser in accordance with the treatment schedule.

Other embodiments provide methods of remediating contaminants. These methods comprise: identifying a first gas product of five different and locally available gas products to be delivered in treatment, where each of the five different gas products are to be generated locally at a geographic location to be treated; generating, locally at the geographic location being treated, the first gas product; delivering, below ground level and through one or more wells, the generated first gas product to a soil region proximate one or more contaminants to be treated; cycling through a series of treatment steps defined in a treatment schedule to generate and control the delivery of one or more of the five different gas products to the geographic location.

Still other embodiments provide methods of removing contaminants from a soil formation. These methods comprise: activating a remediation treatment schedule to remediate contaminants within a soil formation, where the treatment schedule comprises a plurality of treatment steps; and sequentially implementing each of the plurality of treatment steps, comprising, for each step: identifying, in accordance with the step of the treatment schedule, one gas product of five different gas products to be delivered to the soil formation; generating, in response to the identifying the one gas product and at the geographic location of the soil formation, the one of the five gas products; and delivering the generated one gas product as defined by the treatment step being implemented.

BRIEF DESCRIPTION OF THE DRAWINGS

The above and other aspects, features and advantages of several embodiments of the present invention will be more apparent from the following more particular description thereof, presented in conjunction with the following drawings.

FIG. 9 depicts a main menu interface according to some embodiments.

FIG. 10 depicts a simplified representation of a configuration interface according to some embodiments.

FIG. 11 shows an example configuration selection interface that allows a user to define and/or generate a treatment steps for a treatment schedule and configure options for the step.

FIG. 12 shows an example of a configuration all user interface.

FIG. 13 shows an example set all product type user interface.

FIG. 14 shows an example system status user interface.

FIG. 15 shows an example utilities user interface.

FIG. 16 shows an example of a field logging menu user interface.

FIG. 17 depicts an example of a system override user interface that can be used to obtain status information and to skip from one step to another in the treatment schedule.

FIG. 18 depicts an example of a maintenance menu user interface.

FIG. 19 depicts an example of a suspend mode user interface.

FIG. 20 depicts an example of the set day of the week interface to be used with the suspend mode.

FIG. 21 depicts an example of a set start lag user interface according to some embodiments.

FIG. 22 depicts an example of a set breakthrough delay user interface according to some embodiments.

FIG. 23 depicts an example of a more utilities user interface according to some embodiments.

FIG. 24 depicts an example of an internal ozone sensor history user interface according to some embodiments.

FIG. 25 depicts an example of an add or remove sequence steps user interface according to some embodiments.

FIG. 26 depicts an example of a total hours user interface.

FIG. 27 depicts an example of a history user interface that can be activated from the total hours user interface.

FIG. 28 depicts a warning user interface that is activated in response to a user selecting to reset hours.

FIG. 29 depicts an example of an alarm menu user interface.

FIG. 30 depicts an alarm list user interface that includes a list of alarms that have occurred.

Figure 1:
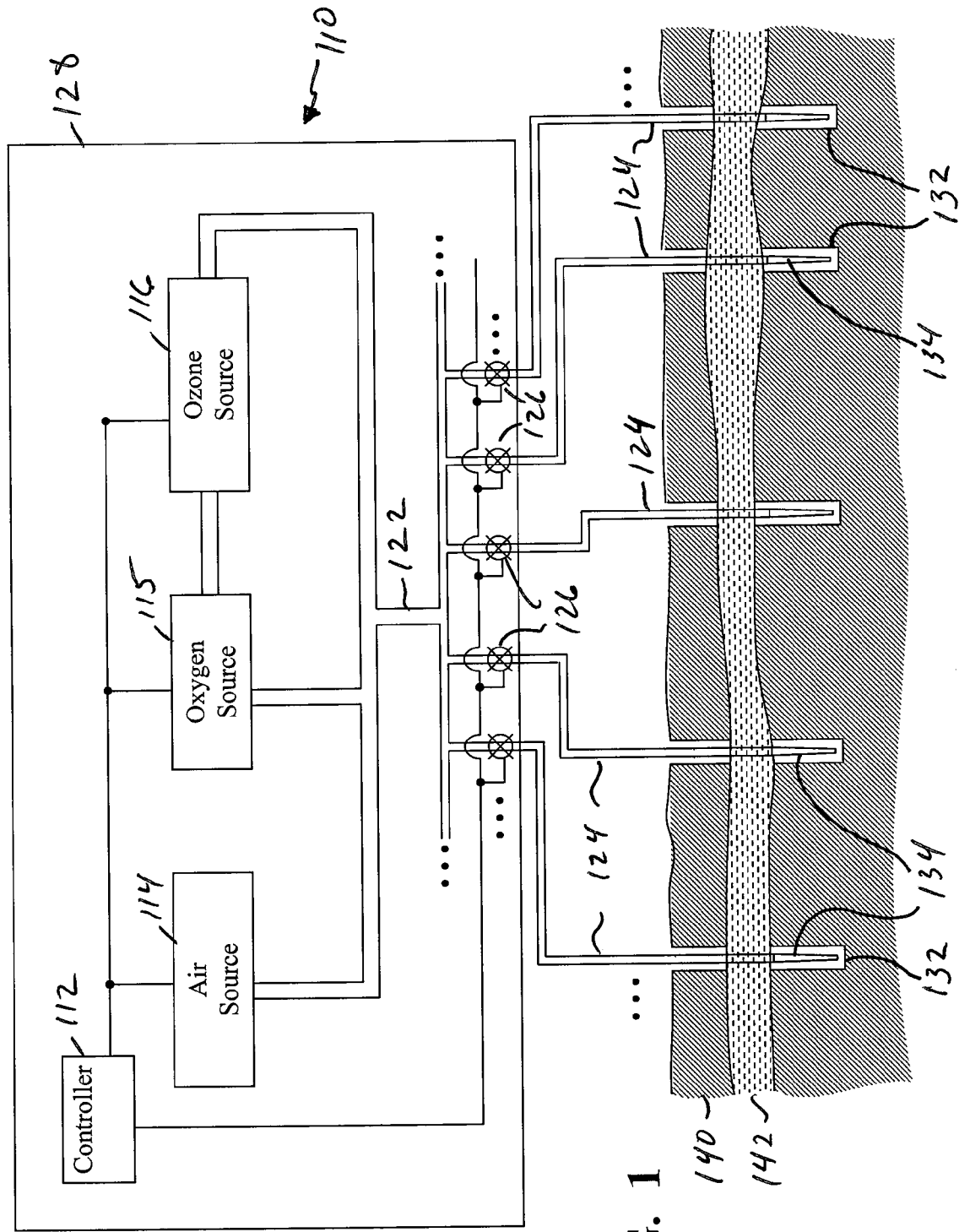
FIG. 1 depicts a simplified block diagram of a remediation system according to some embodiments.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

The present embodiments provide systems, methods and processes for use in treating contaminants in groundwater and/or soil. Some embodiments provide sparge systems and processes for in-situ remediation, such as but not limited to, oxidation, biodegradation and volatization of contaminants in groundwater and/or soil. For example, the remediation system can produce and deliver reactant products for in-situ chemical oxidation, in-situ bioremediation, volatization and/or other relevant remediation techniques. In some implementations, the remediation systems are capable of generating and delivering five different gas products to the sub surface contamination zone, where the five gases products are: (1) air; (2) oxygen; (3) air and oxygen; (4) oxygen and ozone; and (5) air, oxygen and ozone. These five gases products can be delivered in sequential steps or stages. For example, the one or more gas products can, in accordance with some embodiments, be delivered to and dispersed through a diffuser or other relevant dispersion devices.

Some embodiments implement a schedule, sequence or program in controlling the remediation. The system can include an automated sequencer that allows user configuration of each step in the treatment schedule. This step configuration identifies one or more valves to be active per step, a step duration, and what product type is delivered. As the system schedule runs, the control system monitors various parameters, conditions and/or alarm conditions and reacts accordingly. Some embodiments employ a fault tolerant regression strategy. In attempts to enhance and/or maximize productivity, these embodiments respond to alarm conditions and automatically revert to the most effective alternate production state when the alarm condition or threshold condition dictate that the system cannot continue delivering the schedule product for the corresponding step. This regression strategy can minimize system downtime and enhance, and in some instance optimize, remediation results.

In some implementations the present embodiments can be employed with in-situ remediation and/or treatment. For example, the gas products generated through at least some of the present embodiments of the remediation and/or sparge systems can be used for the process of in-situ chemical oxidation, in-situ bioremediation, and volatization. In-situ chemical oxidation (ISCO) is developing quickly and is likely one of the most rapidly growing remedial technologies applied, for example, at Environmental Protection Agency (EPA) hazardous waste sites. Project managers are utilizing ISCO on both new and old sites. ISCO involves the introduction of a chemical oxidant into the subsurface for the purpose of transforming ground water or soil contaminants into less harmful chemical species. ISCO results in the transformation of a wide range of environmental contaminants, enhances mass transfer, and is being used at old sites for example to reduce the contaminant mass flux from source areas to downgradient pump and treat systems, and/or to reduce anticipated cleanup times required for natural attenuation and other remedial options. In some instances of in-situ chemical oxidation processes, there are two gasses that can be delivered to the contaminated vadose and groundwater zones within the geological formation. The two gas products are an ozone and oxygen gas product, and an air, oxygen and ozone gas product.

Accelerated in-situ bioremediation (ISB) provides for a substrate or nutrients to be added to an aquifer to stimulate the growth of a target bacteria and/or a consortium of bacteria. Usually the target bacteria are indigenous, however enriched cultures of bacteria (from other sites) that are highly efficient at degrading a particular contaminant can be introduced into the aquifer (sometimes termed bioaugmentation). Accelerated ISB is used where it is desired to increase the rate of contaminant biotransformation, which may be limited by lack of required nutrients, electron donor, or electron acceptor. The type of amendment required depends on the target metabolism for the contaminant of interest. Aerobic ISB may simply include the addition of oxygen, while anaerobic ISB often employs the addition of both an electron donor (e.g., lactate, benzoate, etc.) as well as an electron acceptor (e.g., nitrate, sulfate, etc.). Chlorinated solvents, in some instances, often utilize the addition of a carbon substrate to stimulate reductive dechlorination. At least one of the goals of accelerated ISB is often to increase the biomass throughout the contaminated volume of aquifer, thereby achieving effective biodegradation of dissolved and sorbed contaminant. In some instances of in-situ bioremediation processes, there are two gas products that can be delivered to the contaminated vadose and groundwater zones within the geological formation. The two gas products are oxygen, and an air and oxygen gas product.

Air sparging can provide an in situ remedial technology that reduces concentrations of volatile constituents in petroleum products that are adsorbed to soils and dissolved in groundwater. This technology, which is also known as "in situ air stripping" and "in situ volatilization," involves the injection of substantially contaminant-free air into the subsurface saturated zone, enabling a phase transfer of hydrocarbons from a dissolved state to a vapor phase. The air is then vented through the unsaturated zone. In some instances of in-situ volatization processes, there are three gas products that can be delivered to and/or around the contaminated vadose and/or groundwater zones within the geological formation to be treated. These three gas products are an air gas product, an air and oxygen gas product, and an air, oxygen and ozone gas product.

FIG. 1 depicts a simplified block diagram of a remediation system 110 according to some embodiments. The remediation system includes a remediation controller 112, a plurality of gas product sources, which in some instances comprises an air source system 114, an oxygen source and/or purifier system 115, and an ozone source system 116. The remediation system 110 typically further includes a distribution manifold 122, one or more delivery units 124, and in some implementations one or more valves 126. Some embodiments include a housing or enclosure 128 to enclose and/or protect, for example, the remediation controller 112, the gas product sources 114-116, some or all of the distribution manifold 122 and the valves 126.

The remediation controller 112 is coupled with the air source system 114, the oxygen source system 115, the ozone source system 116, and the one or more valves 126. The air source system 114, the oxygen source system 115 and ozone source system 116 are coupled with the distribution manifold 122. The one or more valves 126 may be cooperated with the manifold 122 and the delivery units 124. In some embodiments, the distribution manifold 122 includes and/or is implemented as a solenoid valve manifold that allows a gas product to be delivered to the well through a common valve manifold. The manifold utilizes solenoid valves 126 to direct the delivered gas product to the appropriate delivery units 124 and thus appropriate well 132. In some implementations, the manifold 122 can includes two check valves 370, 371 to prevent backflow, a delivery pressure gauge 380 (e.g., a 100 psi delivery pressure gauge), and a pressure transmitter 382 (e.g., a 0-100 psi pressure transmitter). The distribution manifold 122 can include substantially any number of valves 126, and in some implementations is provided with intervals of ten valves 126 (e.g., 10, 20, 30, or 40 valves), depending on the remediation system implemented, the area to be treated, treatment duration, distribution of wells and other such factors. A power source (not shown) is also included that provides power to the system 110. This power source can be from standard utility lines, a generator (e.g., a fuel generator) or substantially any other relevant power source.

As described in detail below, the remediation controller 112 implements a treatment and/or remediation schedule, sequence or program, and communicates with the plurality of product sources to activate and control one or more of the product sources to produce and deliver one or more gas products or reactants to the distribution manifold 122 in implementing the treatment schedule. The remediation controller 112 further communicates with the valves 126 to trigger one or more valves to open or close allowing the one or more gas products delivered to the distribution manifold 122 to be dispersed through one or more desired delivery units 124 corresponding to the triggered valve(s) 126 in accordance with the treatment schedule. The delivery of gas products to two or more delivery units 124 (sometimes referred to as sparging in banks) can be implement, for example, by hooking up two delivery units 124, and thus two wells, to a single outlet (e.g., a single valve 126) on the manifold 122, two solenoid valves can be enabled (e.g., defined within the treatment schedule) to open at the same time and therefore directing the gas product between two delivery units 124. It is noted that in some instances, where two or more delivery units 124 are active at a given time, a flow balance may be implemented in attempts to equalize the distribution of the gas product.

The remediation system 110 is capable of generating, at the site being remediated, five different gas products from the single system. Further, the remediation controller 112 can control the product sources to produce one or more of the five different gas products at varying concentrations to deliver multiple different concentrations to achieve the desired treatment. Furthermore, the remediation controller 112 can control the production sources 114-116 according to a defined schedule to produce an appropriate one of the five different gas products depending on which well 132 and delivery unit 124 is intended to be active in accordance with the treatment schedule. Additionally, the remediation controller can switch between delivery units to implement the treatment schedule and achieve the remediation. Still further, because the remediation system 110 generates the five different treatment products, the remediation system 110 can continue to operate in an attempt to optimize remediation results.

In operation, the delivery units 124 are positioned within wells 132 formed in the soil 140. In some implementations, the delivery units 124 are positioned to extend below the water table 142. The delivery units 124 typically further include an ejector, diffuser, in situ oxidation point (IOP) or other dispersion device 134. The reactant or product supplied to the delivery unit 124 is dispersed into the soil 140 and/or groundwater 142 through the dispersion device 134. The dispersion device 134 can be substantially any device capable of dispersing the product to the soil and/or groundwater, such as but not limited to, a slotted well screen, a microporous diffuser (e.g., a Polyvinylidene Fluoride (PVDF) microporous diffuser), or other relevant device. In some embodiments the dispersion devices are constructed from porous PVDF tube stock that is cut to an appropriate length, a top and bottom are machined from solid PVDF (e.g., solid Kynar®), and the top and bottom are fixed at opposite ends of the cut porous PVDF tube (e.g., fuse welded, bonded or the like).

In some embodiments, the delivery units 124 include a riser-pipe extending down from a well head connection (WHC) positioned within a well head. The riser-pipe, which in some instances may be assembled from a series of riser-pipes coupled together (e.g., 10 foot long riser-pipes), extends from the well head connection to the dispersion device 134. The well head connection is coupled with the distribution manifold 122 with a glue, epoxy, threading, compression fitting, or the like, or a combination thereof, for example, in some embodiments the well head is connected with the distribution manifold or conduit pipe extending from the manifold, through a compression fitting, such as a Kynar® compression fitting, within the well box. Additionally, the well head connection is coupled with the raiser-pipe, for example, with a glue, epoxy, threading, compression fitting, or the like, or a combination thereof. Further, the well 132 may be configured or packed with material to aid in the dispersion of the gas products and/or limit or prevent release of the gas product through the well. For example, the well may be packed with a porous material such as sand around the dispersing device 134 (which in some instances is an in situ oxidation point (IOP)), with a layer of bentonite chips above the sand (e.g., a layer that is about two feet), and a layer of bentonite grout above the layer of bentonite chips (e.g., a layer that is about five feet).

Figure 2:
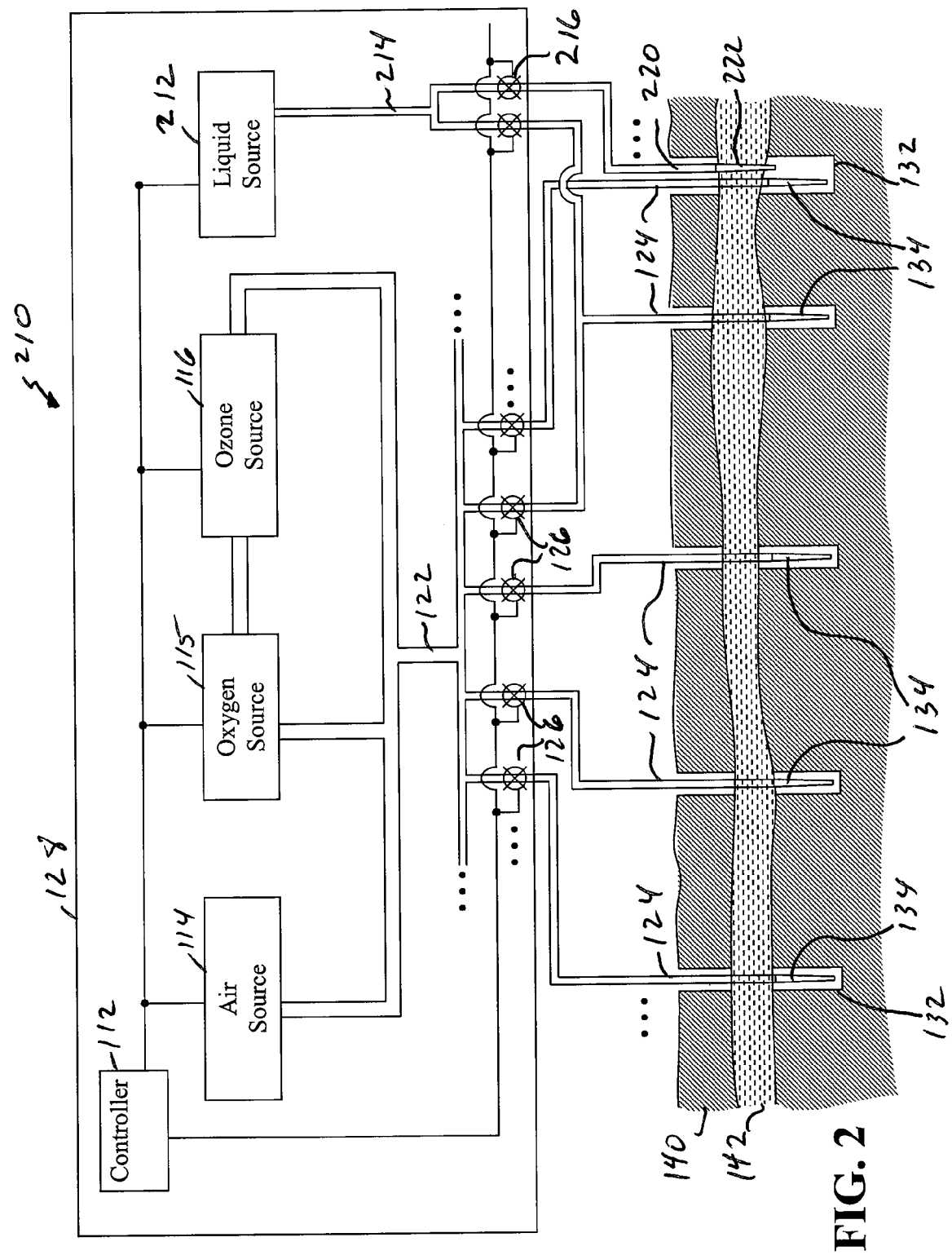
FIG. 2 depicts a simplified block diagram of a treatment or remediation system according to some embodiments.

FIG. 2 depicts a simplified block diagram of a treatment or remediation system 210 according to some embodiments. Similar to the remediation system 110 of FIG. 1, the remediation system 210 includes a remediation controller 112, a plurality of gas product sources, which in some instances comprises an air source system 114, an oxygen source and/or purifier system 115, and an ozone source system 116, a distribution manifold 122, one or more delivery units 124, and in some implementations one or more valves 126. The remediation system 210, in some implementations, further includes one or more liquid product sources 212, a liquid distribution manifold 214, and one or more additional liquid valves 216. Further, the remediation system 210 may include one or more separate liquid delivery units 220 and/or the liquid manifold 214 may feed into one or more of the delivery units 124 that can be used to deliver either a gas product or a liquid product depending on the schedule as implemented by the remediation controller 112. The remediation controller 112 is coupled with the air source 114, the oxygen source 115, the ozone source 116, the liquid source 212, and the one or more valves 126, 216. A power source (not shown) is also included that provides power to the system 210. This power source can be from standard utility lines, a generator (e.g., a fuel generator) or substantially any other relevant power source.

The liquid delivery units 220 can be positioned within a well that 132 that also includes a delivery unit 124 used to deliver one or more of the plurality of available gas products, or in a separate well. The liquid delivery units 220 further include an ejector, diffuser, IOP or other dispersion device 222. The liquid reactant or product supplied to the delivery unit 124 or liquid delivery unit 220 is dispersed into the soil 140 and/or groundwater 142 through the dispersion device 134 or dispersion device 222. The liquid dispersion device 222 can be substantially any device capable of dispersing one or more liquid products to the soil and/or groundwater, such as but not limited to, a slotted well screen, a high density polyetheline or polypropylene diffuser, a microporous diffuser (e.g., a polyvinylidene fluoride (PVDF) microporous diffuser), or other relevant device.

Figure 3:
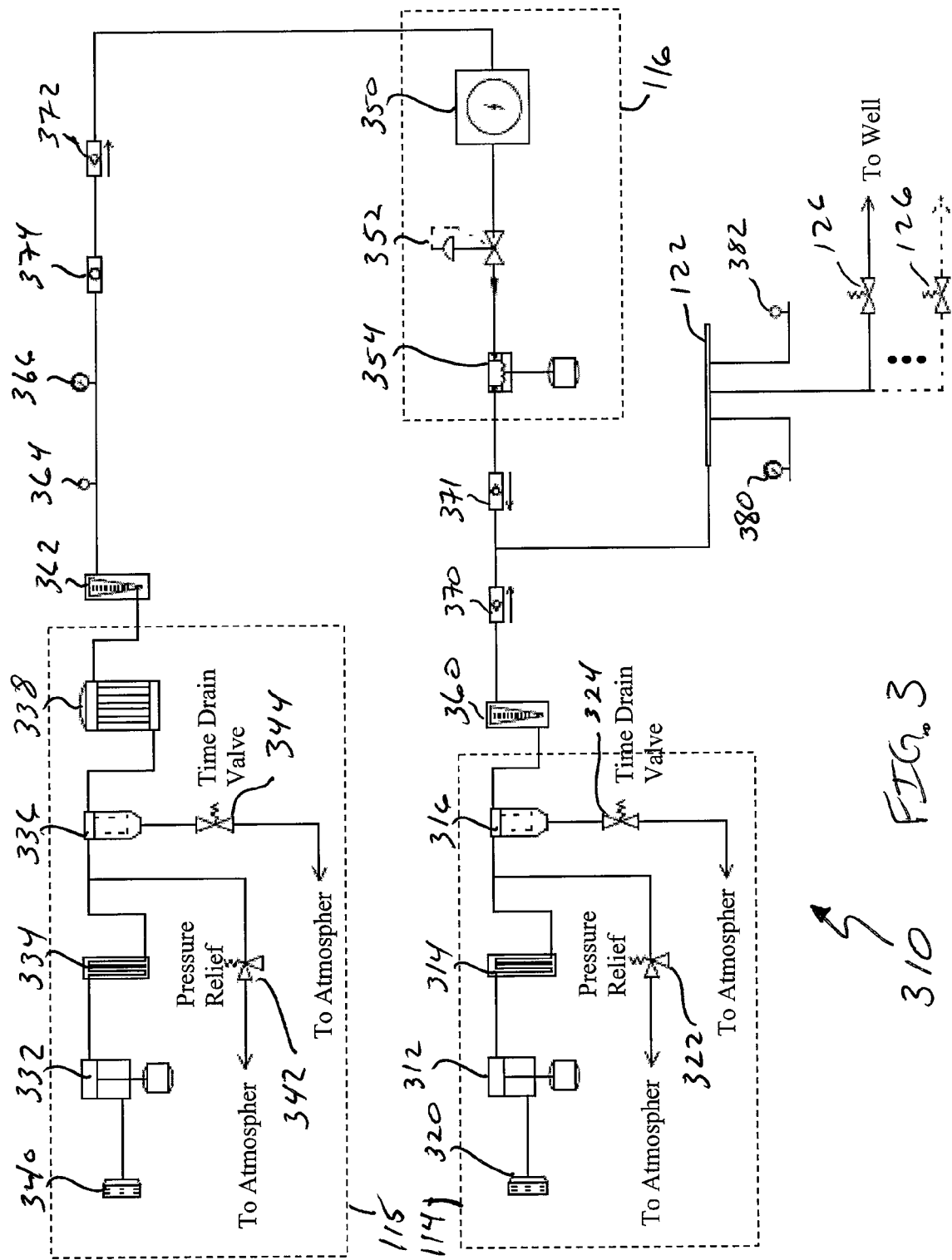
FIG. 3 depicts a simplified block diagram of a remediation system according to some embodiments.

FIG. 3 depicts a simplified block diagram of a remediation system 310 according to some embodiments, which in some implementations is considered a sparge system. The remediation system 310 includes an air source system 114, an oxygen source system 115, an ozone source system 116, the distribution manifold 122, one or more valves 126 and the remediation controller 112 (not shown in FIG. 3). Some embodiments further include measurement devices and/or control devices as described below.

The air source system 114 includes an air compressor 312, a cooler 314 and a moisture or water separator 316. In some embodiments, the air source system 114 further includes an inlet air filter 320, and can additionally include a pressure relief valve 322. The water separator 316 similarly can include a drain valve 324 to release the separated water. The air source system 114 generates compressed air, and in some embodiments generates dry, cooled and compressed air that is delivered to the manifold 122. The compressor 312 can be substantially any relevant compressor that generates the desired compression pressure at the desired flow rate and can continuously operate for extended periods of time, such as days, weeks or even months. For example, the compressor 312 can be an oil-less dual head piston compressor. The cooler 314 can also be substantially any relevant air cooler that can maintain the temperature of the compressed air flow at or below a desired temperature threshold for the periods the air source system 114 is operating, and the water separator 316 can similarly be substantially any relevant moisture separator that can output the substantially dry or moisture free compresses air flow during the operation of the air source system 114.

The gas flow and/or pressures generated by the air source system 114 can be substantially any relevant flow rate and/or pressure depending, in part, on the type and power of the compressor 312 and desired operating parameters. For example, in some implementations the air source system 114 generates the air gas product from ambient air with an air gas stream flow rate of greater than 0.2 CFM (Cubic Feet per Minute), and in some instances produces an air gas stream with a flow rate of between 2 to 4 CFM, depending on a sparge pressure and/or sparge flow rate within the well 132 or the soil formation being treated (e.g., a sparge pressure of less than 50 psi (pounds per square inch). Again, however, greater or lower flows and/or pressure can be employed depending on desired implementations. The pressure relief valve 322 can provide pressure protection to the air source system 114 and/or remediation system 310, and can be set depending on expected implementation and operating parameters. For example, in some implementations the pressure relief valve 322 can be a 100 psi relief valve.

The oxygen source system 115 includes a compressor 332, an cooler 334, a moisture or water separator 336 and an oxygen concentrator and/or purifier 338. In some embodiments, the oxygen source system 115 further includes an inlet air filter 340, and can additionally include a pressure relief valve 342. The cooler 334 cools compressed air. The cool compressed air is more readily utilized by the concentrator 338 and helps to reduce operating temperatures of the condenser. Further, a cooler oxygen gas flow can enhance ozone generation and the concentration of the ozone. Similarly, the air flow is cooled in attempts to maintain and/or improve ozone concentrations when air is mixed with the ozone. The water separator 336 can include a drain valve 344 to purge the separated water. The dry, cooled and compressed air is processed to concentrate the oxygen through the oxygen concentrator 338 and generate a concentrated oxygen gas product.

The compressor 332 can be substantially any relevant compressor that generates the desired compression pressure at the desired flow rate and can continuously operate for extended periods of time, such as days, weeks or even months. As one example, the compressor 332 can be an oil-less dual head piston compressor. The cooler 314 can also be substantially any relevant air cooler that can maintain the temperature of the compressed air flow at or below a desired temperature threshold for the periods the oxygen source system 115 is operating, and the water separator 316 can similarly be substantially any relevant moisture separator that can output the substantially dry or moisture free compressed air flow during the operation of the oxygen source system 115.

In some embodiments, the oxygen concentrator 338 includes a pressure swing absorption oxygen concentrator. Additionally or alternatively, the oxygen concentrator 338 can purify the oxygen by, at least in part, trapping and purging nitrogen from the air, for example using a molecular sieve within cylinders of the oxygen concentrator 338. The oxygen compressor 332 delivers air to the oxygen concentrator 338. In some implementations, the flow is regulated using a flow meter 362 in line after the oxygen concentrator 338. The oxygen concentrator 338 in some implementations, at least in part, employs an Advanced Technology Fractionator (ATF®) available from Sequal Technologies, Inc. of San Diego, Calif. The oxygen source system 115 allows the remediation system 310 to generate, from ambient air and at the remediation site, a concentrated oxygen gas stream having an oxygen purity that is greater than 80%, depending on flow rates and/or pressures, and in some implementations greater than 90% purity, for example, between 90-94% purity at about 18 to 24 CFH (Cubic feet per hour) at a −100° F. dew point. The oxygen gas flow and/or pressures generated by the oxygen source system 115 can be substantially any relevant flow rate and/or pressure depending, in part, on the type and power of the compressor 332 and desired operating parameters.

Further, the remediation system 310 creates a combined air and oxygen gas product stream by combining the oxygen and air gas streams together into one stream. For example, the generated oxygen gas product and the generated air gas product can be combined in the manifold 122 to create the resulting air and oxygen gas product. The purity of the oxygen gas product when combined with the air gas product can vary depending on flow rates, pressures, intended use of the combined air and oxygen gas product and other such factors. In some implementations the oxygen purity in the combined air and oxygen gas product is, for example, between about 35-40%. As described above, however, this may vary and in some embodiments the remediation controller 112 may provide some control over the gas concentrations to achieve desired oxygen purity. Similarly, the combined flow rate of the air and oxygen gas product can vary. For example, in some implementations, the flow rate of the air and oxygen gas product can be produced between about 2 to 4.5 CFM. It is noted as further below, however, that different flow rates and/or pressures can be applied depending on the components employed to implement the system, the geological formation being treated and other such factors, and that in some instances, for example, a high flow remediation system can be employed that produces gas products at flow rates that can be at 8 CFM or more.

The ozone source system 116, in some embodiments, is coupled with the oxygen source system 115 to receive at least a portion of the concentrated oxygen gas. In other embodiments, the ozone source system 116 can include a separate oxygen system that delivers a purified oxygen stream to an ozone generator of the ozone source system 116. The concentrated oxygen is received in the ozone source system 116 and ozone gas is generated from the oxygen producing a resulting mixed ozone and oxygen gas product. The ozone source system 116 includes an ozone generator 350. In some embodiments, a backpressure regulator 352 and/or an ozone delivery pump 354 can additionally be included and/or cooperated with the ozone generator 350. The delivery of the clean, dry, concentrated oxygen flow to the ozone generator 350 greatly improves the output capability of the ozone generator and prevents premature failure of critical internal components.

In part, the backpressure regulator 352 controls the internal flow and pressure of the ozone generator 350. The backpressure regulator 352 holds pressure at a certain level, and thus, maintains the flow rate at a relatively constant flow. In some embodiments, the backpressure regulator 352 is adjustable to allow adjustments to achieve a desired internal pressure within the ozone generator 350. The delivery pump 354 is used to aid the delivery of an ozone and oxygen gas product from the ozone generator to the manifold 122. The ozone delivery pump 354 is ozone gas resistant, and in some implementations is a single speed diaphragm pump. The delivery pump 354 operates in concert with the ozone generator and boosts the pressure up to meet and/or overcome the well and/or sparge back pressure that results from the pressure induced on the dispersion device 134 by the geological formation and the height of the water column above the dispersion device 134. For example, the ozone generator reaction chamber is set at a constant pressure (e.g., 8 psi) while the remediation system 110 is sparging at 40 psi. As such, the ozone delivery pump 354 acts as a pressure booster for the ozone and oxygen gas product to overcome the backpressure induced by the formation and height of the water column to get the gas product to travel out into the formation.

In some implementations, the combined ozone and oxygen gas product is generated by passing the concentrated oxygen gas stream through a corona discharge ozone generator, such as Plasma Block® ozone generator available from Plasma Technics, Inc. of Racine, Wis., that converts some of the concentrated oxygen gas into ozone gas. The combined gas composition of the ozone and oxygen product can vary depending on implementation, desired concentrations, pressures and flow rates. In some embodiments, the combined gas composition can comprise an ozone gas concentration of greater than 2% by weight, and in some instances greater than 4% by weight. For example, in some implementations, the combined gas composition comprises an ozone gas concentration of about 6 to 8% by weight at 18 to 24 CFH (Cubic feet per hour) and an oxygen gas purity of about 90% to 92%, while in other implementations the concentration can be adjusted to be less than 6% by weight. In another example, the ozone generator 350 can supply 52 grams/hour with a concentration of about 6% by weight at about 10-12 psi. Again, the concentration of ozone can be varied depending on desired treatment. As with the air source system 114 and oxygen source system 115, the ozone and oxygen gas flow rates and/or pressures generated by the oxygen source system 115 can be substantially any relevant flow rate and/or pressure depending, in part, on the type and power of the compressor 332, ozone generator 350 and delivery pump 354 employed and the desired operating parameters and treatment schedule.

Adjustments may be implemented with at least some implementations to improve and/or optimize performance of the ozone source system 116. For example, to obtain desired pneumatic parameters within the ozone generator(s) 350, the oxygen flow meter(s) 362 can be adjusted to about 18 standard cubic feet per hour (SCFH). The backpressure regulator 352, which in some embodiments can be a stainless steel backpressure regulator, located downstream of the ozone generator 350 can be adjusted to attain a desired operating pressure, for example an operating pressure of about 10 PSI for some implementations. Opening the regulator can lower reaction cell pressure while increasing oxygen flow. Conversely, closing the valve can raise the pressure while decreasing oxygen flow. The oxygen flow meter(s) 362 and the backpressure regulator 352 can be adjusted together until the desired flow and pressure are reached, which in some embodiments are indicated by on one or more pressure gauges and flow meters.

The remediation system 310 further generates a combined air, oxygen and ozone gas product by adding the air gas stream to the oxygen and ozone gas stream. The two gas streams are blended together, for example, prior to and/or within the distribution manifold 122. The combined gas product composition can vary depending on flow rates, pressures and other such factors, and the remediation controller 112 provides control over the concentration. In some embodiments, for example, the combined air, ozone and oxygen gas product composition can be ozone gas concentration of between about 1 to 3% by weight, an oxygen gas purity of 35 to 45% purity, and air.

Some embodiments are high flow systems that can provide double or more the gas product flow rates. These high flow remediation systems can be employed, for example, for packed or dense geological formations (e.g., denser silty, clay formation) where a greater gas product flow can potentially increase the radius of influence. For example, a high flow air source system 114 could generate, in some implementations, an air flow of between about 0.2 to 8 CFM.

As introduced above, in some embodiments the remediation system 310 can include additional elements that are used to control the flow, maintain pressures and/or provide operating conditions and parameters to allow the remediation controller 112 to implement adjustments to the system. For example, some implementations include a flow meter 360 in line with the air source system 114 that can be used to regulate the air flow to the manifold 122. A second flow meter 362 can be positioned in line with the oxygen source system 115 and can be used to regulate the oxygen flow in the line after the oxygen concentrator 338. Further in some implementations the delivery pump 354 can be operated in cooperation with the oxygen source system 115 to deliver an oxygen gas product to the manifold 122 at a desired pressure even when the ozone source system 116 is not operating. Again, the delivery pump 354 can be utilized, at least in part, to compensate for pressures induced by the geological formation and/or height of the water table on the delivery unit 124. One or more pressure switches 364 and/or gauges 366 can be included to provide feedback to the remediation system 310. For example, a low pressure switch 364 can be used to detect low pressures indicating there is something wrong with the oxygen concentrator motor or compressor 332. Further, a regression strategy can be activated.

One or more check valves 370-372 may also be included to provide appropriate directional flow. Some embodiments additionally include an oxygen purity meter 374 that monitors the oxygen purity of the oxygen product flow and/or provides information to the remediation controller 112 with purity information to allow the remediation controller to control the remediation process, track an amount of product delivered to the well sites, provide the user with information (e.g., a report and/or log) and the like. Other elements can be incorporated into the remediation system 310 in addition to, or in place of, one or more elements identified above, such as moisture sensors, flow meters, valves, temperature gauges, switches, by-passes, overrides and other such elements.

The distribution manifold 122 cooperates with one or more valves 126 that when activated release the product from the manifold to the corresponding distribution unit 124 and well 132 to be distributed into the geological formation and/or groundwater. In some embodiments, the manifold 122 can include additional elements that monitor, report and/or provide operating conditions, parameters and/or feedback to allow the remediation controller 112 to implement adjustments to the system. For example, the distribution manifold 122 can include one or more gauges 380 and/or pressure transmitters 382. The pressure transmitter 382 and flow meter 360 can be monitored to determine, at least in part, whether there is an increase in back pressure. Increased back pressure could indicate that the well and/or point is being fouled (e.g., indicating higher concentration of manganese and/or inorganic compounds in the formation and/or water that is packing up around well 132). The product flow is important in achieving a desired remediation. The remediation system 310 attempts to provide a sufficient product flow to achieve a lateral radial influence away from the well 132.

Figure 4:
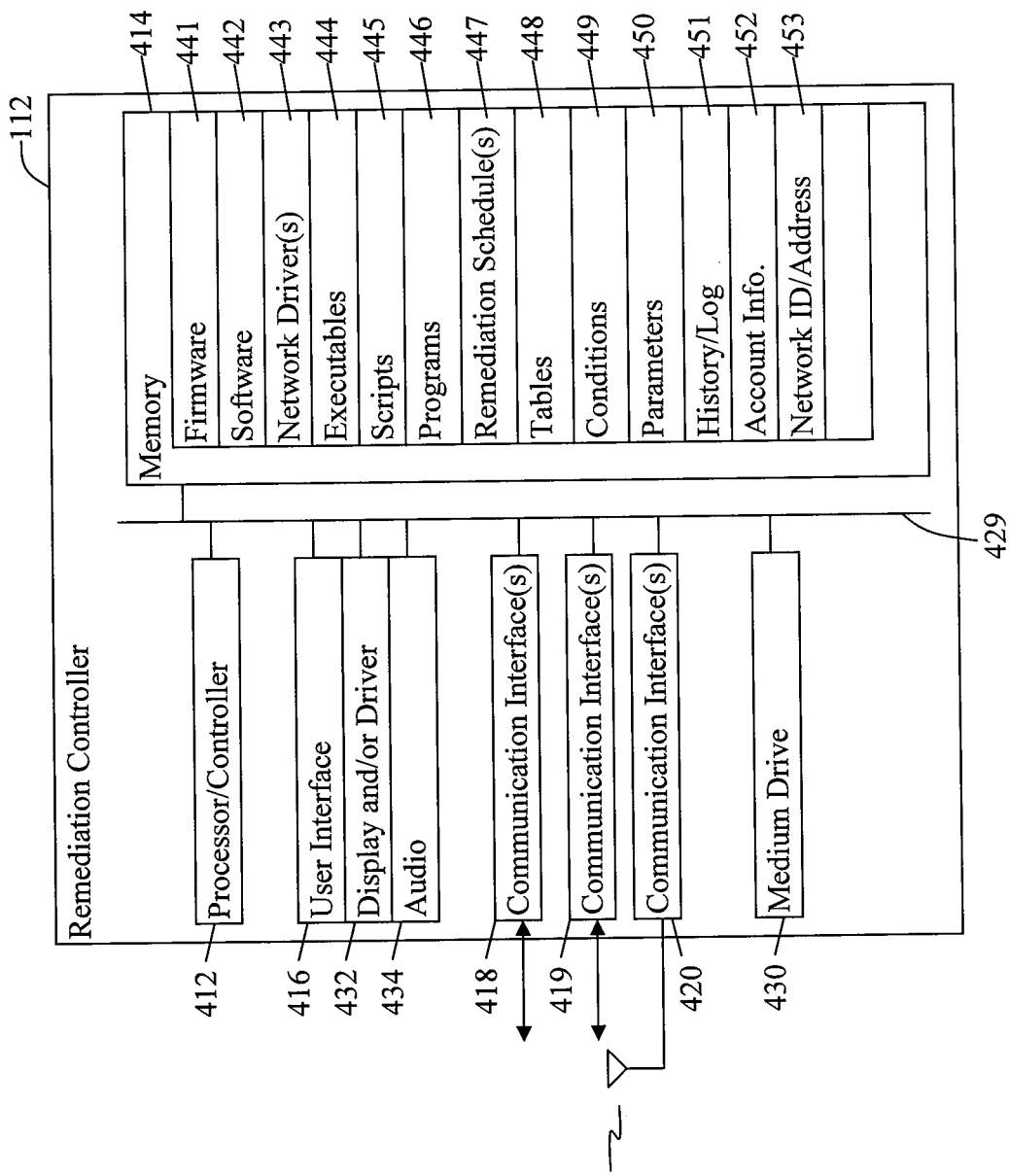
FIG. 4 depicts a simplified block diagram of the remediation controller according to some embodiments.

FIG. 4 depicts a simplified block diagram of the remediation controller 112 according to some embodiments. The remediation controller 112 includes one or more processors and/or controllers 412, one or more memory or computer readable storage 414, user interface 416, one or more communication interfaces and/or ports 418-420 and other relevant components such as internal communication links and/or buses 429, and the like.

The one or more processors and/or controllers 412 can be implemented through one or more microprocessors, processors, programmable logic controllers (PLC), minicomputers, logic or other such processing devices or combinations of devices configured and/or programmed with executable instructions or that execute programming to control the generation of gas products, access and implement the treatment schedule or program, and provide functional control of the remediation system 310. In some embodiments, the processor(s) 412 can include processing functionality, such as decoders, encoders, demultiplexors, multiplexors, decryption devices, encryption devices, and the like; however, these functions can alternatively or additionally be implemented through separate devices cooperated with the processor(s) 412. Additionally, the processor(s) 412 includes communication functionality and/or directs additional devices to process received communications (e.g., communications from gauges, meters, sensors, from remote devices and other such communications) and transmit communications. Some implementations provide a panel view—human machine interface device (HMI) that a user can utilize in programming the processor and/or PLC.

The memory 414 is coupled with the processor(s) 412 and typically includes one or more processor readable and/or computer-readable mediums accessed by at least the processor(s) 412 and can include volatile and/or nonvolatile media, such as RAM, ROM, EEPROM, flash memory, cache memory or other memory technology. The memory can store firmware 441, software 442, network or communication drives 443, executables 444, scripts 445, programs 446, one or more remediation schedules and/or programs 447, tables 448, conditions 449, parameters 450, history and/or log data 451, profiles and/or account information 452, network device ID and/or one or more addresses 453 and the like.

The user interface 416 can be included in the remediation controller 112 that allows the user to interact with the remediation controller 112 and can include substantially any relevant interface, one or more displays, physical buttons, lights, LEDs, touch screen, mouse, touch pad, stylus, an optical or radio communication interface for wireless communicating, or other such user interfaces or combinations thereof. Additionally, the user interface 416 can further include graphical user interfaces displayed on the display 432 or a display coupled with the remediation controller 112, such that the remediation controller 112 receives selections and/or commands corresponding with options and/or fields displayed through the user interface. The display 432 can be substantially any relevant display such as, but not limited to, a cathode ray tube display, a liquid crystal display (LCD), plasma display panel, light emitting diode display, touch screen, and other relevant displays. Similarly, the audio 434 can be substantially any relevant audio drive, device and/or system, such as one or more speakers, speaker drivers and the like.

The one or more medium drives 430 receive a portable storage medium and allows the controller 422 or other relevant components to access content stored a portable storage medium accessed through a medium drive. The portable storage medium can be substantially any portable computer or processor readable medium, such as a disc, flash memory and other such memory as described above, that can receive data from and/or provide data to the remediation controller 112.

The one or more communication interfaces 418-420 provides ports, interfaces, connections, antenna and/or the like through which the remediation controller 112 can communicate with other external devices, remote devices and/or over communication networks. The one or more communication interfaces provide wired or wireless communication. Further, in some instances, the communication interfaces can include interfaces such as, but not limited to, a parallel port, an IEEE 1394 serial port, a game port, a USB port, Ethernet network port, an IR interface, RF interfaces, antenna, Wi-Fi, Bluetooth, 802.11, cellular, satellite or other such relevant interfaces. The communication interface(s) 418-420 allow the remediation controller 112 to communication with external devices, memory devices and/or remote devices coupled with the remediation system 310 over a distributed network.

As such, the remediation system 110 can be accessed directly using a user interface 418-420. Further, a portable computing device, such as a laptop, handheld computing device or the like can directly couple with the remediation system 110, for example via an Ethernet port. Additionally, the remediation system 110 can be accessed remotely through wired or wireless communication. In some implementations, the system can connect with a distributed network, such as the Internet, and allow remote access. For example, the remediation system 110 can couple with the Internet through telephony, cable, fiber optic and/or other relevant connections. Additionally or alternatively, the remediation system 110 can include wireless capability, such as wireless broadband through satellite and/or cellular communication that allows the remediation system 110 to connect with the distributed network.

By controlling the product sources 114-116, the remediation controller 112 can generate on site at the geographic location to be treated one of five different gas products to be fed to the distribution manifold 122. Specifically, the remediation controller 112 can activate only the air source system 114 to generate a compressed air gas product. Alternatively, the remediation controller 112 can activate the oxygen source system 115 to generate an oxygen gas product. In some instances the purified oxygen gas product is passed through the ozone source system 116, but by maintaining the ozone source system 116 in an off or stand-by state the oxygen gas product passes through the ozone source system 116 without the generation of ozone to deliver the generated oxygen gas product to the manifold 122. Further, the remediation controller 112 can activate the air source system 114 and the oxygen source system 115 to supply a mixed air and oxygen gas product. In some instances, the remediation controller can alternatively activate the oxygen source system 115 and the ozone source system 116 to supply a mixed oxygen and ozone gas product. The remediation controller 112 can cause the generation of a fifth gas product by activating the air source system 114, the oxygen source system 115 and the ozone source system 116 to produce a mixed air, oxygen and ozone gas product.

Furthermore, the remediation controller 112 can control and adjust concentrations of the different gas products when producing the mixed gas products depending on the treatment schedule. For example, the air, oxygen and ozone gas product is, in some implementations, generated by adding the air gas product stream to the oxygen and ozone gas product stream at predefined pressures and flow rates. The two gas streams are blended together prior to and/or as they pass through the distribution manifold 122 to produce the combined gas product with a composition having an ozone gas concentration of about 1 to 3% by weight, an oxygen gas purity of 35 to 45% purity, and air. Again, this is a representative example of the composition of a combined gas product. Other concentrations and resulting compositions can be achieved by varying flow rates and/or pressures. The generated gas product streams are delivered to the delivery units 124 and dispersed into the soil, groundwater and/or other formation being treated in accordance with the treatment schedule or program. For example, the remediation system 310 can be used for in-situ chemical oxidation, in-situ bioremediation, volatization and/or other such remediation techniques.

As described above, the implementation of the soil and/or groundwater remediation is controlled through a treatment schedule or program. The schedule defines, in part, when valves 126, 216 are to be activated and/or opened, which valves are to be activated, durations the valves are to be open, the product to be delivered to the deliver unit 124, the concentrations of products to be supplied to the delivery units, overrides and/or disablements, alarm conditions, adjustments and/or regression strategies to be implemented and other such characteristics. In some implementations, the schedule is defined as a series of steps, sequences or stages.

Figure 5:
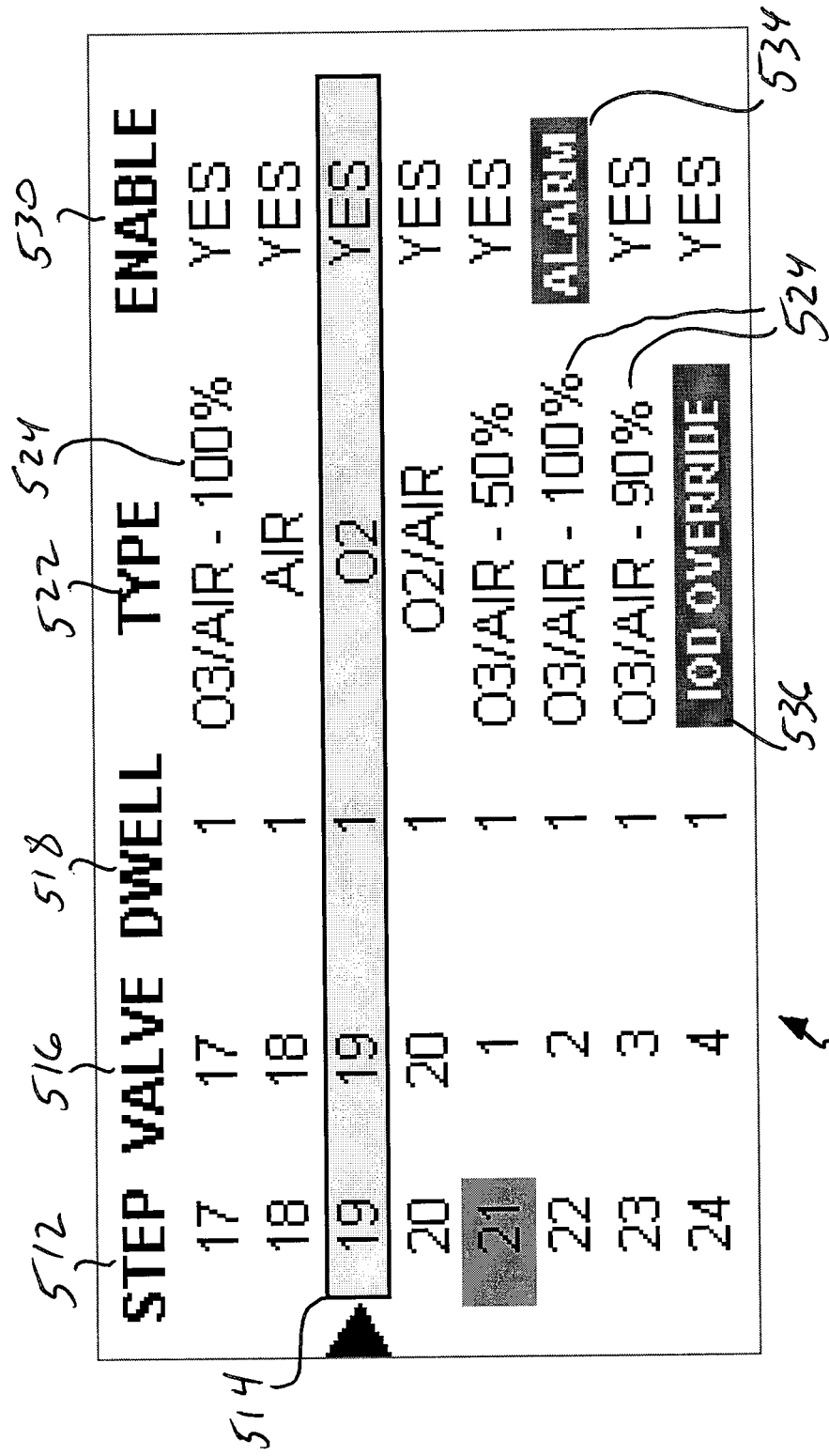
FIG. 5 depicts a simplified graphical representation of a portion of a treatment schedule according to some embodiments.

FIG. 5 depicts a simplified graphical representation of a portion of a treatment schedule 510 according to some embodiments. As described above, the schedule 510 includes a series of steps 512 that in some implementations are sequentially numbered and specifies the numerical order in the treatment schedule or sequence. Some embodiments provide substantially any number of steps to be defined, while other embodiments may limit the number of steps that can be defined within a single treatment schedule (e.g., a maximum of 100 available steps). Typically, there is no minimum number of steps. In many implementations, however, each step is associated with a single valve and as such a minimum number of steps would be equal to the number of valves cooperated with a delivery unit 124. The treatment schedule 510 can be viewed through the user interface 416 and/or display 432 during operation. Further, an indicator, bar or highlighted section 514 can be displayed in some implementations to identify the currently active step number within the treatment schedule 510.

One or more valves 126 that are assigned to a step are similarly defined and represented in the treatment schedule 510, in some instances by a valve number or name 516 as is labeled on the remediation system 110. Again, in some implementations, each step 512 is associated with a single valve identifier 516. Typically, the corresponding valve 126 enabled in the treatment schedule is independent of the step or product chosen to be delivered through the valve for that step. As such, the treatment schedule 510 can enable a valve at more than one step in a treatment schedule. For example, a "step 3" in the schedule can enable a "valve 4" on an ozone and oxygen gas product, while another step, such as "step 4" can also enable the same "valve 4" on an oxygen gas product. In this method, a single well can receive a combination of different gas products in a complete sequence, and all the valves do not have to be activated the same number of times or deliver the same gas product or operate for the same duration.

A duration or dwell time 518 defines an amount of time that a gas product is supplied to the designated valve 126, and thus to the corresponding delivery unit 124. The dwell time 518 can be substantially any amount of time. In some instances, however, the dwell time 518 may have limits, for example, between 0 and 120 minutes. If the dwell time is set to 0, the step in the treatment schedule is effectively skipped without disabling valve of the same number in subsequent steps. For example, if a first three steps are set to valve 1, and alternate from an ozone and oxygen product, to an air gas product, to an oxygen gas product; one of these steps may be effectively removed from the schedule by setting the dwell time of the desired step to 0.

A product type identifier 522 identifies the gas product assigned to be produced by the remediation system 110. Further, as described above, some embodiments allow the composition and/or concentrations of gas products to be varied. As such, the treatment schedule 510 can further identify the concentrations 524, such as varying concentrations of ozone, oxygen, air, and blends of these gas products.

Substantially any relevant information, options and/or parameters relevant to a step can be defined in the treatment schedule 510, and similarly displayed when the treatment schedule is displayed. For example, some embodiments include an enable indicator 530. This enable indicator 530 identifies whether or not the valve corresponding to the step is enabled in the treatment sequence 510. In displaying the treatment schedule 510, for example, in one implementation an enabled valve is identified with a "YES" identifier or indicator 530 under an enabled column. A valve configured as disabled will display "NO" indicator 530 under the enabled column. Typically, the enabled/disabled selection applies to all steps where that identified valve appears. For example, if the first 3 steps are set to valve 1, and alternate from an ozone and oxygen product, to an air gas product, to an oxygen gas product, all of these steps will be disabled in the treatment schedule 510 if the user disables valve 1 in any step.

In the displayed treatment schedule 510, other information can be provided, such as an indication of operating conditions or parameters, and/or notifications and/or alarms 534. For example, if a high pressure alarm for a particular valve occurs, typically that valve will automatically be skipped, regardless of its configuration, and an "ALARM" indicator 534 can be displayed for that valve on all corresponding steps. Similarly, notifications, warnings, override indicators and other such information 536 can also be displayed to notify a user of existing conditions.

In many instances, default settings are defined. For example, the minimum number of steps 512 are defined, the valve 516 for that given step will correlate with the number of that step (e.g., STEP 1, VALVE 1), with a default dwell time 518 being set (e.g., 30 minutes), a default gas product 522 is set (e.g., ozone, oxygen and air product blend), and all valves are disabled 530.

Again, multiple sequential steps can be directed to the same valve. Further, the sequential steps can vary the gas product delivered to the valve, and/or can vary concentrations and/or composition of the gases of gas products. Therefore, the treatment schedule and the steps defined within the treatment schedule, in part, allows a user to define the remediation treatment to be implemented utilizing one or more of the five different gas products that are generated locally at the site being treated. Further, the schedule allows a user to vary the gas product delivered to a well, the concentration and/or composition of the gas product, the duration of treatment and the frequency for which a product is delivered to a well. Additionally, the treatment schedule allows the remediation controller 112, in part, to implement the desired remediation treatment.

Figure 6:
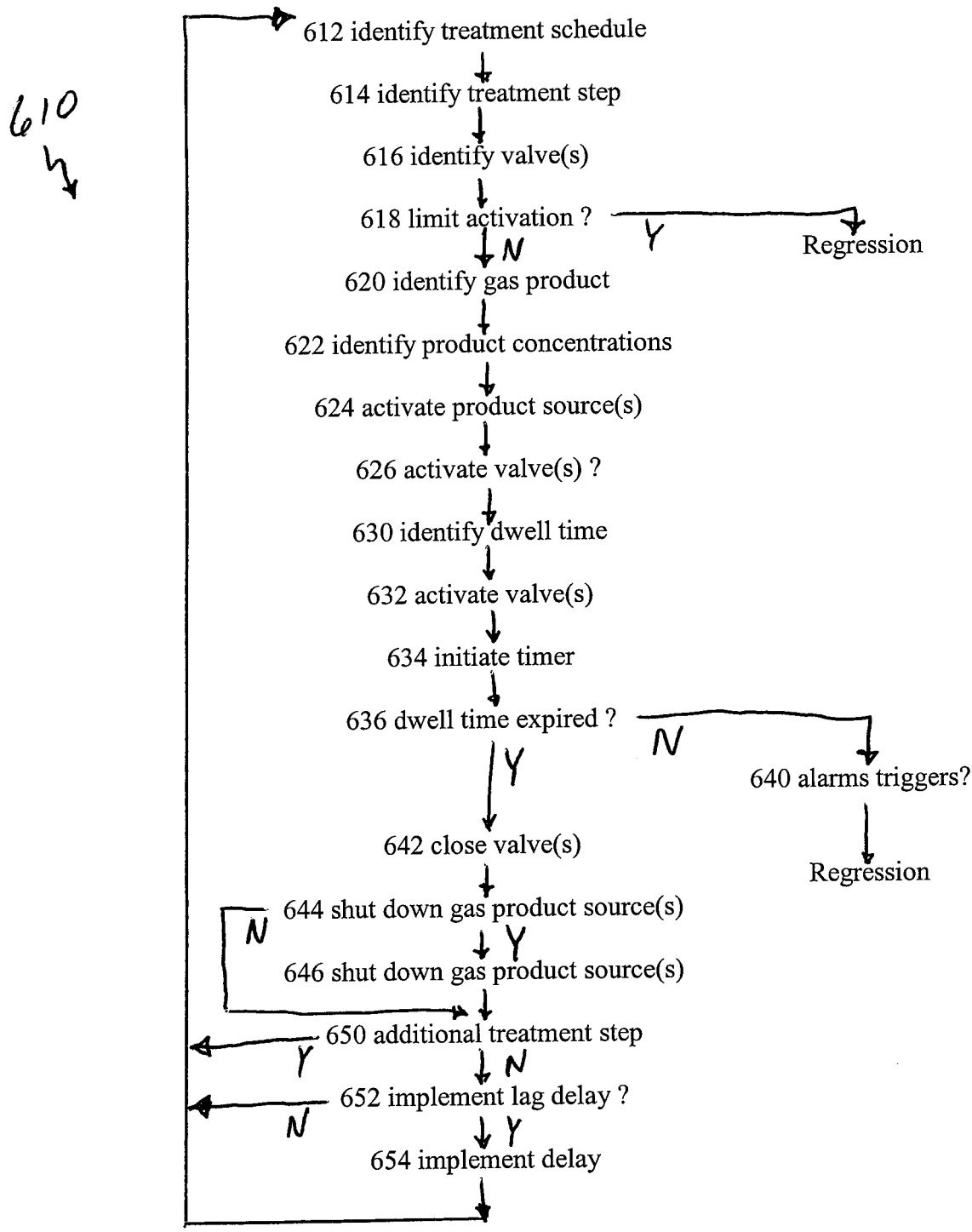
FIG. 6 depicts a simplified flow diagram of a process to implement remediation treatment in accordance with a treatment schedule.

FIG. 6 depicts a simplified flow diagram of a process 610 to implement remediation treatment in accordance with a treatment schedule 510. In process step 612, a treatment schedule 510 to be implemented is identified. In process step 614, a treatment step 512 to be activated in accordance to the treatment schedule is identified. In process step 616, one or more valves associated with the treatment step are identified. In process step 618, it is determined whether conditions exist to limit or prevent activation. As introduced above, the dwell time may be set to zero, the valve may be disabled or other factors, such as alarm conditions, may exist that affect and/or limit the implementation of the treatment step. For example, conditions may exist that prevent a gas product from being delivered while other gas products may still be delivered. In those instances where limits apply the process 610 implements a regression process and/or strategy that is fully described below.

Alternatively, when the treatment step can be implemented and the product delivered the process 610 continues to process step 620 where a gas product is identified that is to be distributed to the delivery unit(s) 124 associated with the designated valve(s) 516 to be activated. In process step 622, a gas product composition and/or concentrations is identified for the gas product to be delivered as specified in the treatment schedule. In process step 624, one or more appropriate product sources are activated to generate the gas products at levels consistent with the indentified concentrations and/or compositions to generate the gas product specified in the identified treatment step 512.

In process step 626, it is determined whether conditions are met to activate the one or more valves. These conditions can include substantially relevant conditions, such as a predefined pressure, a threshold product flow or other such conditions. In those instances where conditions are not met, the process 610 returns to step 626 and waits until the conditions are met, or the process implements a regression process and/or strategy. When conditions are satisfied the process continues to process step 630 to identify a duration or dwell time 518 for the treatment step. In process step 632, the identified one or more valves 516 are activated to release the gas product to the delivery units 124. In process step 634, a timer is initiated.

In process step 636, it is determined whether the designated dwell time 518 has been reached. In those instances where the dwell time has not been reached process step 640 is entered to determine whether alarms have been triggered and/or conditions or parameters have predefined relationships with one or more thresholds. Again, conditions can exist that interfere with the implementation of the treatment schedule as defined, such as problems with the operation of one or more of the gas source systems, pressure problems within the distribution manifold 122 and/or a well 132, ozone leak or other such conditions or factors. When alarms and or conditions are not present and the treatment step can continue the process returns to step 636 to determine whether the dwell time has been reached.

Alternatively, when alarms or conditions exist that limit the ability to implement the treatment step 512 as defined in the treatment schedule, a regression process is activated to adjust the treatment schedule for at least the present treatment step 512 and continue the remediation treatment. For example, the regression strategy may induce the selection of one of the other four locally generated gas products, not currently defined in the treatment step to be implemented, as defined in accordance with the regression strategy such that remediation treatment continues.

Once it is determined in process step 636 that the dwell time has been reached process step 642 is entered where the valve associated with the active treatment step 512 is closed. In process step 644 it is determined whether one or more of the gas product sources 114-116 are to be shut down. This determination can include evaluating a subsequent treatment step to be implemented following the active treatment step to determine whether a different gas product is to be delivered. When one or more gas product sources are not to be shut down the process 610 advances to process step 650. Alternatively, when one or more gas product sources are to be shut down process step 646 is entered where one or more gas product sources is shut down or halted.

In process step 650, it is determined whether further treatment steps 512 are defined in the treatment schedule 510. When further treatment steps are to be implemented the process 610 returns to process step 612. Process step 652 may be entered when an end of the treatment schedule is reached to determine whether an operating or lag delay is to be introduced before returning to the beginning of the treatment schedule to re-implement the treatment schedule. This delay may be defined to allow the remediation system 110 and/or components of the remediation system to cool down, allow additional time between treatments at one or more wells or other such factors. In those instance where a delay is to be introduce step 654 is entered where the defined delay is implemented before the process 610 returns to process step 612 to re-initiate the treatment schedule.

The transitioning back to step 612 results in the identification of a subsequent treatment step that again induces the delivery of a product. The subsequent treatment step can specify one or more of the same valves defined in the immediately preceding step or may identify one or more different valves. Similarly, the step can identify a different product to be delivered and/or the same product with a different composition or concentration. As a result, the treatment schedule provides adjustable steps with the capability to deliver one of five different gas products that are generated locally at the treatment site as well as provide varying valve activation configurations.

As described above, the remediation system 110 can implement a regression strategy when conditions limit or prevent the delivery of the remediation product specified in one or more treatment steps. As the remediation system 110 sequences through the treatment steps of the schedule 510, the remediation controller 112 and/or the product sources monitor various parameters, conditions and/or alarm conditions. A fault tolerant regression strategy is implemented in some instances where conditions interfere with or prevent delivering a specified product or make delivering the product potentially dangerous. In attempts to improve, and in some instances maximize productivity, the remediation controller 112 responds to measured conditions, parameters and/or alarms and automatically, without user interaction, reverts to another one of the unspecified four other gas products that is believed to be the most effective production state when the specified gas product and/or state cannot continue. This regression strategy control theory reduces and attempts to minimize system downtime and improve remediation results over conditions where remediation treatment would have been terminated, at least for an identified one or more valves, until the condition and/or alarm is addressed. The delivery of the gas product regressed to is typically delivered in accordance with parameters associated with the regressed gas product, such as flow rate and/or pressures. In some embodiments, however, these parameters may be adjusted based on the treatment schedule and/or parameters defined by a user.

Further, the regress strategy in selecting the gas product to regress to attempts to continue to provide a desired remediation in accordance with the scheduled gas product, and in some instance to continue to maximize the remediation strategy when the one or more gas products cannot be supplied by regressing to an available gas product in relation to the scheduled gas product that can the next best remediation. In some embodiments, a user can define the regression strategy for one or more of the gas products in the event that regression has to occur. Additionally or alternatively, some embodiments provide the user with an ability to override the regression. For example, a user can select a different gas product to be delivered during a regression instead of a gas product selected by the regression controller 112 in accordance with the regression strategy.

Generally, conditions that are detected to exceed thresholds and/or cause alarms are, in some instances, considered faults causing the remediation controller 112 to regress to a treatment condition that isolates the mechanical and/or electrical issue or issues, while in many instances allowing the remediation system 110 to remain operational, but not necessarily functioning at an optimum or maximum capacity. The various regression states are discussed with respect to conditions, factors and/or alarm condition that may occur. If more than a single condition, factor or alarm condition is present and unacknowledged, the remediation controller 112 compounds the regressed states until treatment can progress or the remediation system 110 is unable to operate. In some instances, the regression strategy can be considered as a two phase regression, a first phase where modifications are implemented in attempts to continue treatment and a second phase where treatment is effectively halted until conditions are addressed.

Figure 7:
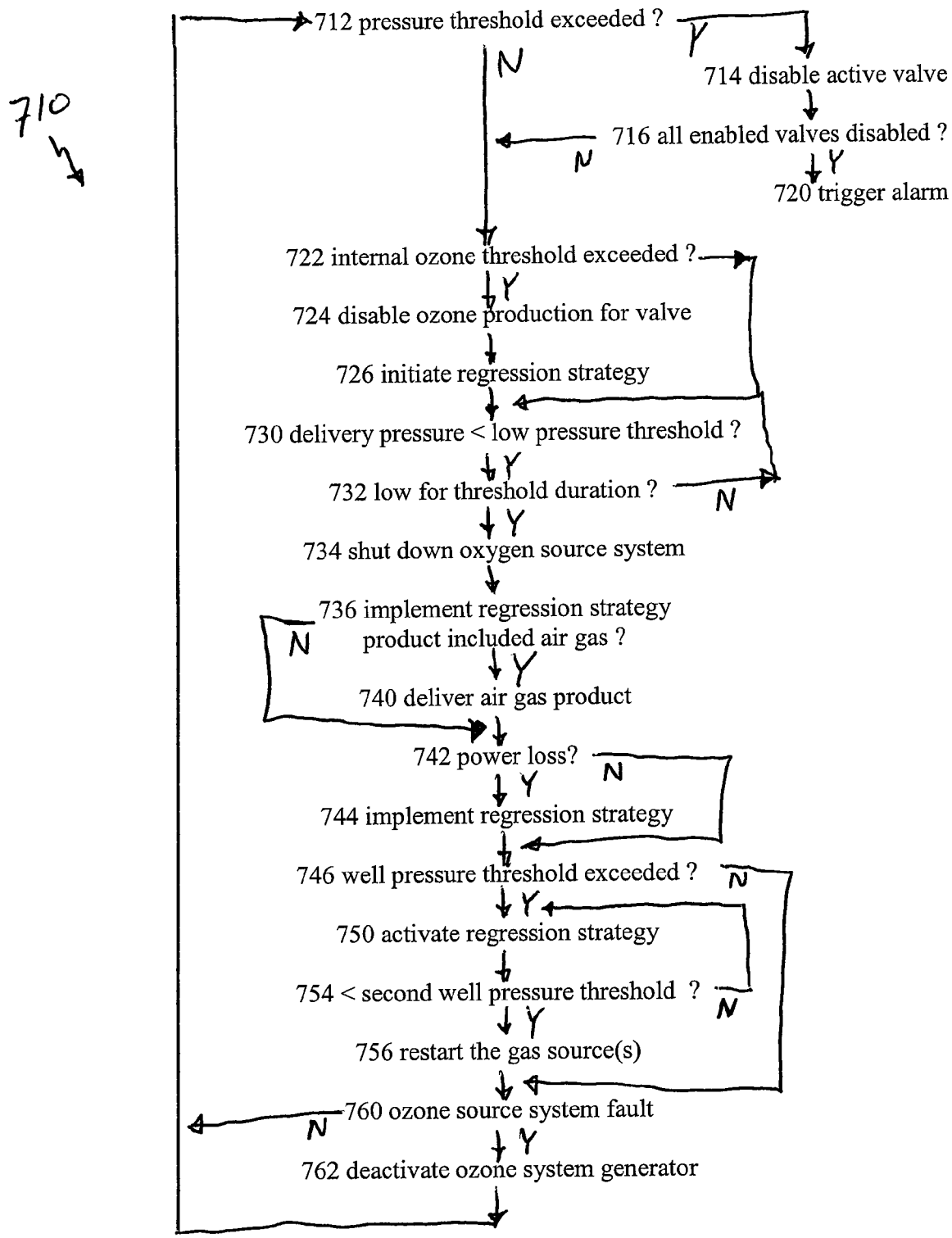
FIG. 7 depicts a simplified flow diagram of a process, in accord with some embodiments, of implementing a regression strategy while attempting to maintain operation of the remediation system and continue treatment.

FIG. 7 depicts a simplified flow diagram of a process 710, in accord with some embodiments, of implementing a regression strategy while attempting to maintain operation of the remediation system 110 and continue treatment. The process 710 can be utilized in some implementations to implement regression identified with respect to the process 610 of FIG. 6. In step 712, it is determined whether a pressure within the remediation system 110, distribution manifold 122 and/or the delivery unit 124 exceeds a pressure threshold. For example, in some embodiments, pressure transmitter 382 is used to monitor the output pressure during operation. If the monitored pressure exceeds a pressure threshold, step 714 is entered where the remediation controller 112 disables the active valve. In one example, in accordance with some implementations, if the system output pressure exceeds an output pressure threshold (e.g., exceeds 90 PSI), the remediation controller 112 disables the active valve. In step 716, it is further determined whether all enabled valves have been disabled due to exceeding pressure thresholds in a single cycle of the treatment schedule. When all enabled valves have been disabled step 720 is entered where an alarm is triggered notifying a user that no eligible valves are enabled. In some implementations, a user has to acknowledge the alarm for each valve to allow the valve back into operation during a subsequent treatment step.

When it is determined in step 712 that a pressure threshold has not been exceeded the process continues to step 722 to determine whether a detected ozone level internal to and/or proximate the remediation system 110 exceeds an internal ozone threshold. The ozone threshold may vary based on one or more factors including the type of remediation system, where the ozone is being measured and other such factors. As one representative example, the ozone threshold for some embodiments may be about 1.0 ppm (parts per million). When the measured ozone levels do not exceed thresholds the process advances to step 730. Alternatively, the process continues to step 724 to disable ozone production for the valve 126 in use at the time the relationship with the threshold is detected and activate a notification and/or alarm, such as display a notification (e.g., "IOD OVERRIDE") in a configuration menu and/or on the displayed treatment schedule 510.

In step 726, a regression strategy is initiated after the gas product is supplied to the valve. In some instances, which can depend on other conditions as described above, the remediation controller 112 induces delivery of the oxygen gas product and the air gas product when the gas product being delivered at the time the ozone alarm was detected was ozone, oxygen and air; or regression is initiated to deliver the oxygen gas product when the gas product being delivered at the time the ozone alarm was detected was ozone. The process 710 then continues to step 730 or returns to step 712.

In step 730, it is determined whether an air delivery pressure from the oxygen concentrator 338 of the oxygen source system 115 has dropped below a low pressure threshold. When the pressure has not dropped the process advances to step 742. Alternatively, step 732 is entered to determine whether the low pressure continues to be below the low pressure threshold for a threshold duration. In those instances where the duration has not expired the process returns to step 730 to continue to measure the pressure for the duration period. For example, the low pressure threshold condition can result when the pressure drops to 6 psi for a threshold period, such as two minutes, for some embodiments. Again, the process advances to step 742 in those instances where the pressure returns to expected operating ranges.

When the pressure from the oxygen concentrator 338 is below the threshold for the threshold duration, the process enters step 734 where the remediation controller 112 shuts down oxygen source system 115 and the ozone source system 116. This, in part, maintains the integrity of the oxygen concentrator 338. In step 736, a regression strategy is implemented where it is determined whether the gas product being delivered at the time of detecting the low pressure included the air gas product. When the air gas product was not being delivered the active treatment step and subsequent treatment steps associated with the same valve and intending to deliver oxygen gas product or ozone and oxygen gas product are marked such that these steps are skipped as the treatment schedule is implemented, and the process advances to step 742. Alternatively, the process 710 advances to step 740 the air gas product continues to be delivered to the valve 126 for the remainder of the treatment schedule duration.

In step 742, it is determined whether power has been lost to one or more of the product sources 114-116 and/or associated equipment (e.g., power loss to the ozone delivery pump 345 that results in a shut down of the ozone source system 116). When no power loss is detected the process continues to step 746. Alternatively, when a power loss is detected the process proceeds to step 744 where the product sources affected by the power loss are identified and a regression strategy is implemented in accordance with the following table for each valve in the treatment schedule 510 that is scheduled to deliver the gas product affected by the power loss:

|  | Product Configuration | | | | |
| --- | --- | --- | --- | --- | --- |
| Power Loss | ozone/Air | ozone | oxygen/Air | oxygen | Air |
| Oxygen system | Air | Skip | Air | Skip | N/A |
| Ozone generator | O2/Air | O2 | N/A | N/A | N/A |
| Ozone delivery pump | Air | Skip | Air | Skip | N/A |
| Air system | O3 | N/A | O2 | N/A | Skip |

The power loss fault conditions are listed on the left, and the gas product configuration options are listed on top. As specific examples, when a power loss occurs to the ozone source system 116 an alarm occurs and one or more valves are schedule to deliver an ozone, oxygen and air gas product (O3/Air), the remediation controller 112 regresses each of these valves to a setting of an oxygen and air gas product (O2/Air). As another example, again with a power loss to the ozone source system 116, and there is a valve 126 schedule to receive an oxygen and air gas product (O2/Air), there would be no change in the gas product delivered to the valve. As yet another example, if a power loss to the ozone delivery pump 354 occurs and one or more valves are scheduled to receive an ozone and oxygen gas product (O3), each valve scheduled to receive the ozone and oxygen gas product will then be skipped in the treatment schedule until the power loss is corrected.

In step 746 it is determined whether a well pressure exceeds a well pressure threshold for a threshold duration. In those instances where the well pressure does not exceed the threshold the process advances to step 760. When the well pressure does exceed the threshold pressure for the threshold duration, a condition sometimes referred to as a breakthrough condition or mode exists and the process continues to step 750 to activate a regression strategy. In this regression strategy, the oxygen source system 115 and ozone source system 116 are stopped, and treatment continues operating with only the air source system 114 active, which can occur in some implementations even when the air gas product is not scheduled to be delivered in the current treatment step. In some embodiments, the implementation of the regression conforms to the treatment schedule, for example, with respect to dwell times. The flow rates and/or pressures may be dependent on the gas identified to be used in regression. Some embodiments, however, additionally or alternatively allow a user to define some parameters in the event of regression, such as overriding dwell times and/or flow rates, or default conditions can be utilized.

In step 754, it is determined whether the well pressure has dropped below a second well pressure threshold. If not, the process returns to step 750 to continue the regression strategy and the delivery of the air gas product. Alternatively, when the well pressure drops, some embodiments continue to step 756 to restart the gas sources in accordance with the treatment schedule for the currently active valve as defined in the treatment schedule.

In step 760, it is determined whether an ozone source system fault or failure is detected. For example, in the event of a mechanical or electrical issue that results in the ozone source system 116 failing, such as a circuit board not generating an activate or ozone on signal, an ozone production fault is triggered occur. In those instances where no fault is triggered the process returns to step 712 to continue to monitor conditions for the same or subsequent treatments steps. Alternatively, when an ozone production fault trigger is detected a regression strategy is implemented in step 762, where the ozone source system 116 is deactivated ceasing the production of ozone for any step enabled for this production state. The regression state for treatment steps that call for the ozone and oxygen gas product will cause the remediation system 110 to continue to run the oxygen source system 115 to produce the oxygen gas product that is delivered to the relevant valves 126; treatment steps calling for a gas product that is an oxygen, ozone and air blend will transition to producing a blended oxygen and air gas product; and a those treatment steps configured to induce the delivery of an oxygen gas product or air gas product or oxygen and air blend gas product will remain unaffected by the alarm state. The process then returns to step 712

Other conditions can result in the interruption and/or shutdown of the remediation system 110. For example, an alarm condition occurs when the remediation system 110 includes a remote ozone sensor and/or is coupled with a remote ozone sensor. The remediation system 110 halts further remediation activities upon receiving a signal from any remote ozone sensor detecting ozone levels greater than an ozone threshold. This alarm condition does not result in the same regression as an internal ozone detection.

An emergency stop or system override stop allows the remediation system 110 to shut down when there are situations that could result in harm to personnel or physical damage to the remediation system 110 or associated equipment. The emergency stop shuts down power contactors to non-PLC (Programmable Logic Controller) components, and stops the treatment processes and mechanical processes in the remediation system 110. Typically, an emergency stop alarm is acknowledged by a user at the remediation system 110, and not through a remote connection, such as a remote telemetry package.

Temperature conditions within the remediation system 110 and/or the components of the remediation system can similarly affect the operation of the system. In some implementations, when an internal temperature if the remediation system exceeds a high temperature threshold a high temperature alarm is triggered. In some embodiments, this threshold is associated with operating parameters of the remediation controller 112, such as operating temperature ranges of PLC controllers, which in some instances has a high temperature threshold of about 131 degrees Fahrenheit. When the internal temperature exceeds the threshold the remediation system 110 shuts down. In some embodiments, the shut down is maintained until the temperature falls within an acceptable operating range and/or below a second threshold temperature, typically lower than the high temperature threshold, and in some instances the shut down is maintained until the alarm is acknowledged. Typically, if the internal temperature is still above the operating range and/or second threshold when the alarm is acknowledged, then the alarm will repeat itself and not allow the remediation system to operate.

Similarly, a low temperature alarm can be triggered when the internal temperature of the remediation system 110 has dropped below a low temperature threshold. Again, in some instances this low temperature threshold can relate to temperatures at which components of the remediation system 110 are affected, such as operating temperature ranges of PLC controllers, which in some instances have a low temperature threshold of about 35 degrees Fahrenheit. When the temperature reaches or drops below this low temperature threshold the remediation system 110 shuts down until the alarm is acknowledged and the temperature increases to an acceptable operating range. This alarm, at least in part, provides some protection to the system by limiting trapped moisture in the water separators and/or other critical parts of the system from freezing and causing damage to the water separator 316, 336, ozone generator 350, valves, delivery pump 354 and other components, as well as keeping some automation components within their operating specifications. In some embodiments, if the temperature is still low when the alarm is acknowledged, then the alarm will repeat itself and not allow the remediation system 110 to operate.

Some embodiments provide a remote shutdown feature that allows users to stop ozone production using an alternative sensor or piece of equipment or interlock. When the output signal from a safety sensor, emergency stop, or shutdown feature of another unit is triggered, the remediation system 110 can be configured to shut down as well.

An analog fault condition can also be provided in some embodiments where the remediation system 110 includes one or more multiple analog output devices that send system process information back to the remediation controller 112. In the event that one of these signals is lost, the remediation system 110 causes an analog fault condition notification, such as the display of an analog fault condition. For example, if the analog pressure signal is lost, a first fault notification is generated and can result in a system shutdown; if an analog ozone signal is lost, a second fault notification is provided and can result in a system shutdown; if the analog temperature signal is lost, a third fault notification is generated and can result in a system shutdown; and if an analog flow signal is lost, a fourth fault notification is generated, which typically does not result in a system shutdown and treatment continues as normal, but flow readings logged in the history typically will not be accurate.

Some embodiments provide an alarm or notification when there are no eligible valves. This alarm can occur by an error in configuration of the remediation system sequence or by the compounding of multiple alarm states. If, through a regression of production states, no treatment steps can be completed, the alarm for no eligible valves will alert the user to this condition.

Figure 8:
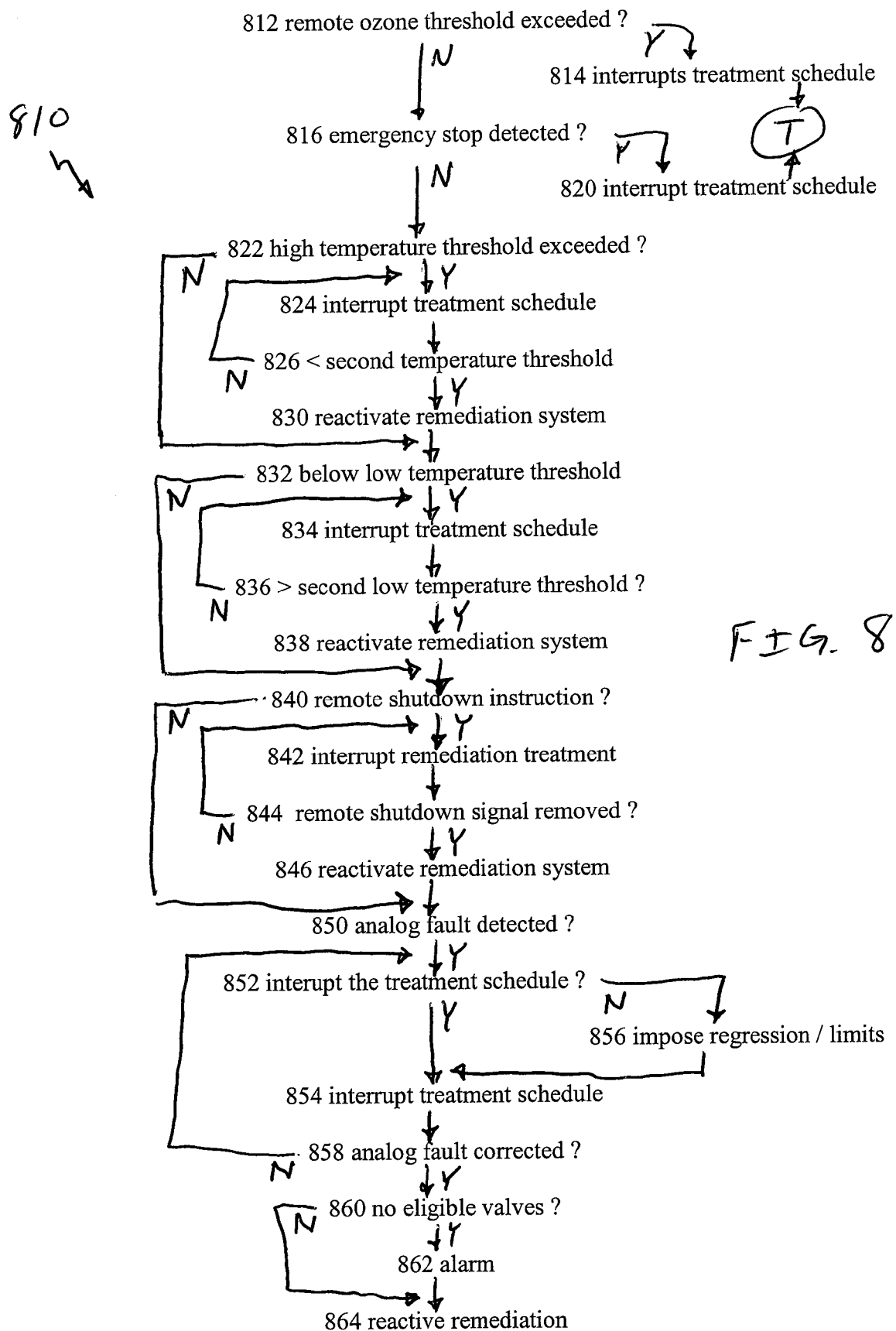
FIG. 8 depicts a simplified flow diagram of a process, in accordance with some embodiments, of implementing at least portion of a regression strategy.

FIG. 8 depicts a simplified flow diagram of a process 810, in accordance with some embodiments, of implementing at least a portion of a regression strategy. The process 810 operates in cooperation with the process 710 of FIG. 7, and can operate in parallel or sequentially with the process 710. Additionally, as with process 710, the process 810 can be utilized, in some implementations, to implement regression identified with respect to the process 610 of FIG. 6.

In step 812, it is determined whether remote ozone levels exceed one or more remote ozone thresholds. This threshold allows for the detection of a leak of ozone from a well or ozone seeping from the geological foundation being treated. The remediation system 110, in some embodiments, includes a remote ozone sensor that communicates with the remediation controller 112. In some instances the communication is only generated when the measured ozone exceeds a threshold, such as an alarm notification. In other implementations, the remote sensor can provide measured ozone levels (e.g., periodically, in response to a request from the remediation controller 112, in response from a user such as a manual activation, or the like). When remote ozone levels do not exceed threshold levels the process 810 advances to step 816.

Step 814 is entered when remote ozone levels exceed threshold levels where an alarm condition is set and the remediation controller 112 interrupts the treatment schedule and prevents further delivery of at least gas products until an override is received and/or remote ozone levels drop below secondary remote ozone thresholds that are typically less than the remote ozone thresholds. The process 810 then terminates.

In step 816, it is determined whether an emergency stop is detected. The emergency stop can be triggered in response to some threshold conditions being reach and/or is manually activated by a user to manually override, for example, to prevent potential damage to personnel operating the remediation system 110 and/or potential damage to the remediation system 110. When an emergency stop is not detected the process continues to step 822. Alternatively, when an emergency stop is detected step 820 is entered where the implementation of an active treatment schedule is interrupted and further remediation is terminated resulting in an effective system shut down until the emergency stop is deactivated or overridden. In some implementations, the override cannot be implemented remotely and instead is preformed at the remediation system 110.

In step 822, it is determined whether a temperature of the remediation system 110 and/or one or more of the components of the remediation system exceed one or more high temperature thresholds. For example, some embodiments utilize a high temperature threshold at which the remediation controller 112 can adversely be affected, such as a temperature above which specifications of a PLC controller indicate the PLC controller should not be operated (e.g., 131 degrees Fahrenheit for some PLC controllers). In those instances where a temperature has not exceeded these thresholds the process 810 continues to step 832. When a temperature does exceed a high temperature threshold step 824 is entered where the active remediation treatment schedule is interrupted. In some instances an alarm and/or notification is generated. In step 826 it is determined whether the temperature has dropped below a second reactivate temperature threshold, where the reactivate temperature threshold is typically less than the temperature threshold evaluated in step 822 that triggered the interruption. In those instances where the temperature has not dropped below the second reactivation temperature threshold the process returns to step 824 to continue to halt the remediation and wait for the temperature to drop.

When the temperature has dropped below the second reactivate temperature threshold step 830 is implemented to reactivate the remediation system 110, and typically continue the remediation treatment from the treatment step where the treatment was halted. In some embodiments an acknowledgement by a user of the high temperature alarm may also be required before reactivating. Further, receiving an acknowledgement of the high temperature alarm, in many instances, will not reactivate the remediation system 110 unless the temperature has also dropped below the second reactivation temperature threshold. Additionally, in some instances, if the temperature is still in excess of the high temperature threshold when the alarm is acknowledged, then the alarm is repeated and the remediation system 110 is not allowed to reactive the remediation.

In step 832, it is determined whether a temperature within the remediation system 110 drops below a low threshold operating temperature. When the temperature has not dropped below the low temperature threshold the process advances to step 840. Alternatively, when it is determined that the temperature has not dropped below the low threshold operating temperature step 834 is entered where the operation of the active remediation treatment is interrupted, and an alarm and/or notification is generated. The low temperature threshold is set to a temperature that can interfere with the operation of the remediation system, such as a temperature that adversely affects the operation of a PLC controller (e.g., 35 degrees Fahrenheit), or temperature that result in damage to one or more of the components of the system, such as temperature where water or other fluids may freeze. As a specific example, a low temperature threshold may be set to protect the remediation system 110 by preventing trapped moisture, for example in the water separators 316, 336, from freezing and causing damage to a water separator and/or the ozone generator 350, as well as keeping the automation components within their operating specifications.

In step 836, it is determined whether the temperature has risen to an acceptable operating range, such as above a second low temperature threshold, where the second low temperature threshold is higher than the low threshold operating temperature. In those instances where the temperature has not risen above the second low temperature threshold the process returns to step 834 to continue to halt the remediation and wait for the temperature to rise.

When the temperature has risen above the second low temperature threshold the process continues to step 838 is reactivate the remediation system 110 and continue the remediation treatment. In some embodiments an acknowledgement by a user of the low temperature alarm may also be required before reactivating. Further, receiving an acknowledgement of the low temperature alarm, in many instances, will not reactivate the remediation system 110 unless the temperature has also risen above the second low temperature threshold. Additionally, in some instances, if the temperature is still below the low temperature threshold when the alarm is acknowledged, then the alarm is repeated and the remediation system 110 is not allowed to reactive the remediation.

In step 840, the process determines whether a remote shutdown instruction is received. Some embodiments provide the capability, for example, to stop ozone production using an alternative sensor or piece of equipment or interlock. The process advances to step 850 when a remote shutdown notification is not received. When the output signal from a safety sensor, emergency stop, or shutdown feature of another unit is triggered, step 842 is entered where the remediation system 110 halts the active remediation treatment. In step 844 it is determined whether the remote shutdown signal is removed. The process returns to step 842 when the shutdown signal is still active and/or has not been acknowledge. Alternatively, step 846 is entered to reactivate the remediation system 110 from the treatment step where the interruption occurred, or in some instances may reset.

In step 850, it is determined whether an analog fault is detected. Some embodiments employ one or more analog output devices that, for example, send system process information back to the remediation controller 112. When one or more of these signals is not received (e.g., based on a scheduled reporting, periodic reporting, in response to a request, or the like), step 852 is entered where the remediation controller 112 generates a warning, alarm and/or notification (e.g., displaying an analog fault condition, illuminating one or more indicators, or the like), and evaluates the fault to determine whether to interrupt the treatment schedule or take regressive measures depending on the fault received. Step 854 is entered when an interrupt is to be implemented, for example, when an analog pressure signal is lost, an analog ozone signal is lost, an analog temperature signal is lost, and/or other such analog faults. Step 856 is entered when the remediation is not to be interrupted and limits may be imposed when relevant. It is noted that in this operating state subsequent information may not be accurate, for example, if an analog flow signal is lost the remediation treatment may continue, but flow readings logged in a history likely will not be accurate.

In step 858, it is determined whether the analog fault has been corrected. The process returns to step 852 when the fault has not been addressed. Alternatively, the process continues to step 860 to determine whether the system detects that there are no eligible valves. This condition may result, for example, by an error in configuration of the treatment schedule, by the compounding of multiple alarm states or the like. When no eligible valves are available, for example through a regression of production states, and no treatment steps can be completed step 862 is entered where an alarm for no eligible valves will alert the user to this condition. Alternatively, when there are eligible valves step 864 is entered and remediation is reactivated or step 864 is entered once at least one valve is enabled.

In some embodiments, the remediation system 110 is configured to remotely communicate conditions when one or more alarms or preselected alarms or conditions are detected. For example, the remediation system can be auto-dialer capable allowing the remediation system to communicate via telephony, radio and/or wirelessly when conditions dictate. Further, some embodiments are pre-wired for auto-dialer contacts in the control panel. Some of the alarms and/or conditions that may qualify for alarm autodialing may include the external ambient ozone alarm, the auxiliary shutdown alarm, the internal ozone alarm, one or more of the temperature alarms, an individual valve high pressure alarm, the no eligible valves alarm and/or other such conditions or alarms.

As described above, some embodiments provide one or more graphical user interfaces (GUI) that are displayed through the display 432, and the user can interact with the GUIs through the user interface, such as through a keyboards, keypad, touch screen, mouse, roller ball, touch pad and/or other such interfaces. The GUIs allow the user to obtain information from the remediation system 110, to generate and/or modify the treatment sequence 510, define thresholds and/or alarm parameters, define other conditions, and otherwise interact with the remediation system 110. For example, a series of GUIs can be provided to allow the user to generate and/or modify a treatment schedule 510.

FIG. 9 depicts a main menu interface 910 according to some embodiments. The main menu interface 910 includes a start option 912, a stop option 914, a system status field 916 that identifies current operating statistics about the remediation system 110, a system status option 918, a configuration option 920, an alarms option 922, a utilities option 924 and a view totals option 926.

The remediation treatment of a site can be started and stopped from the main menu interface 910 using the start option 912 and the stop option 914, respectively. The system status field 916 allows a user to view current system status, such as: a status 930 that defines a system mode or status (e.g., sequence mode, field logging mode, alarms exist, suspend mode, off, no valves enabled, lag mode, breakthrough, zero dwell, or internal ozone detection (IOD) override exists); a currently active step 932 of the treatment schedule when the remediation system is actively implementing the treatment schedule; a product type 934 that is being delivered for the active step, and which may also identify concentrations and/or percentages of gas products (e.g., ozone output percentage); a performance 936 that can identify an active valve associated with the active step, and can additionally provide some operating parameters, such as but not limited to current pressure and flow rate.

The system status option 918 actives a subsequent system status user interface (see FIG. 14). The configuration option 920 activates a configuration interface (see FIG. 10). The alarms option 922 activates an alarms menu interface (such as FIG. 29). The utilities option 924 activates a utilities interface (see FIG. 15). The view totals option 926 activates a total hours interface (such as FIG. 26).

FIG. 10 depicts a simplified representation of a configuration interface 1010 according to some embodiments, which can be accessed, for example, by selecting the configuration option 920 on the main menu interface 910. The configuration interface 1010 allows a user to configure the treatment schedule or sparging sequence. The configuration interface 1010 displays a portion of a defined treatment schedule 1012, which in some instances displays a step value 1014, a valve identifier or number 1016 corresponding to the step, a dwell time 1018, a product type 1020 delivered for the step and an enable indicator 1022. Again, the step parameter 1014, in some implementations, specifies the numerical order in the treatment schedule. The system can employ substantially any number of steps, however, some systems employ a limit or maximum number of steps, such as a maximum of 100 available steps from which to configure. Similarly, a minimum number of steps may correspond to the number of valves to be active through the remediation system 110. As described above, one or more valves may be associated with a given step, but in some implementations this may be limited to a single valve per step, where typically the step order cannot be changed during operation. The active step number may be highlighted within the configuration screen 1010 during operation.

The valve parameter 1016 identifies a physical valve number or identifier (e.g., as is labeled on the remediation system 110). A valve that is enabled in a treatment step is typically independent of the step or product chosen for that valve. The valve can thus be enabled at more than one step in a treatment schedule. As such, with this method a single well can receive a combination of different products in a complete schedule.

The dwell time 1018 identifies an amount of time that a gas product is delivered through the corresponding valve. The dwell time can be substantially any duration. Some embodiments, however, may impose limits, such as a limit between 0 and 120 minutes. In some implementations, when the dwell time is set for 0, the step in the treatment schedule is skipped without disabling valves of the same number in subsequent steps.

The product type 1020 indicates the gas product, and in some instances gas composition and/or concentrations, that is to be produced by the remediation system 110 when the corresponding step is active. For example, the product type 1020 may specify one or more concentration of gases when a gas product was a combination of gas flows, and/or may identify a composition of the gas product.

The enable indicator 1022 identifies whether or not the valve corresponding to the identified step is enabled in the treatment sequence. In some implementations, the enabled/disabled selection applies to all steps where that valve appears. If an alarm, such as a high pressure alarm, for a particular valve occurs, then the valve is automatically skipped, regardless of its configuration, and an alarm indicator is depicted for that valve on corresponding steps.

The configuration interface 1010 further includes options, such as a configuration option 1030, a previous option 1032, an up option 1034, a down option 1036, a page up option 1038, an page down option 1040, a configure all option 1042 and an internal ozone detection (IOD) reset option 1044. A user can navigate through the configuration interface and the displayed treatment schedule using the, up option 1034, down option 1036, page up option 1038 and the page down option 1040.

The previous option 1032 returns to the main menu interface 910. The configuration option 1030 activates a step configuration interface (see FIG. 11). The configure all option 1042 activates a configure all interface (see FIG. 12).

If an internal ozone detect alarm has occurred during implementation of a treatment schedule, for one or more treatment steps, ozone production is typically restricted on valves associated with those one or more treatment steps. The valves can be allowed to return to distributing produced ozone after the IOD (Internal Ozone Detect) alarm has been acknowledged and reset with the reset IOD option 1044.

FIG. 11 shows an example configuration selection interface 1110 that allows a user to define and/or generate the treatment steps for the treatment schedule 510 and configure options for the step. The configuration selection interface 1110 identifies a step 1112 being generated and/or altered, one or more valves 1114 specified by a user to be associated with the step 1112, a dwelling time or active duration 1116, a gas product 1118 to be delivered when the step 1112 is active, an enable parameter 1120. In some implementations the configuration selection interface 1110 further includes a plurality of options that allow the user to navigate through the available user interfaces, such as a previous option 1132 that returns to a previous user interface (e.g., the configuration interface 1010), a reverse option 1134 and a forward option 1136.

Through the configuration selection interface 1110 the selected step 1112 can be configured in the treatment schedule. By selecting the set valve option 1122 (e.g., by pressing an F1 key, using a pointing device or the like) a user can specify one or more valves 1114 to be associated with the step 1112 being configured. In some implementations a numeric key pad is provided and/or displayed (e.g., on a touch screen or in cooperation with a pointing device) in response to selecting the set value option 1122 allowing the user to enter the valve number or identifier that is to be enabled during this step 1112 being configured. A selection of a "return" button on the keypad enters this valve value. Similarly, selecting the set dwell option 1124 allows the user to set the duration that the gas product is delivered during the step. Again, in some embodiments a keypad may appear, and the user can enter a dwell time value.

To set the injection gas product for the treatment step being configured, a user selects the set product type option 1126. In some implementations, pressing this option multiple times allows the user to scroll through the available options for given products. In other embodiments a pull down menu may be displayed or a user can designate a product source. To enable the valve to run in the treatment step, the user can select the set enable option 1128, which in some embodiments will cause a toggle between yes and no, with "yes" indicating that the valve will be part of the schedule and "no" indicating that the valve (as defined by this step) is disabled for the schedule.

The set O3 option 1130 allows a user to select ozone (O3) and/or a blend with ozone as a product for the step being configured. In some embodiments, the user can choose to limit the physical mass of ozone being produced without restricting the flow rate of the system. Again with some implementations, a keypad can be provided and/or displayed allowing the user to designate a concentration. For example, a user can choose between available options, such as selecting a number between 1 and 10, with 1 equating to 10% ozone output and 10 being 100% ozone output. For example, selecting 20% ozone output in some embodiments results in a 10.4 gram per hour production state, when this remediation system is capable of producing 52 grams per hour. To advance to a treatment step occurring before or after the step 1112 currently displayed and configured the user can select the reverse option 1134 or the forward option 1136. The previous option 1132 returns to a previous user interface (e.g., the configuration interface 1010).

FIG. 12 shows an example of a configuration all user interface 1210. This interface includes a set dwell for all steps option 1212, a set sparge product for all steps option 1214, a set ozone output for ozone valves 1216, an enable all valves option 1218, a disable all valves option 1220 and a previous option 1222. The set dwell for all steps option 1212 allows a user to set the duration the product is delivered or a duration of sparging for all steps alike. A keypad may be provided, associated with the system and/or will be displayed allowing the user to specify the dwell time, which in some implementations may have maximum limit, such as 120 minutes. The set sparge product for all steps option 1214 allows the user to set the product type for all steps alike. In some instances the selection of this option transitions between different options, in other embodiments a pull down menu can be displayed. In yet other embodiments a separate product type or sparge type user interface is displayed (see FIG. 13).

The set ozone output for ozone valves option 1216 allows a user to set the mass output of the ozone generator for all ozone enabled valves. A keypad can be provided or displayed allowing the user to specify the concentration and/or choose between 1 and 10, with 1 equating to 10% O3 output and 10 being 100% O3 output. To enable or disable all the valves in the treatment schedule the user can select the enable all valves option 1218 and the disable all valves option 1220, respectively. The previous option 1222 returns to the previous user interface.

FIG. 13 shows an example set all product type user interface 1310, which can be activated from the configure all user interface 1210 of FIG. 12. This interface provides a set all steps to ozone/air option 1312 to set all steps for ozone and air blend gas product. The set all steps to oxygen/air option 1314 sets all steps for oxygen and air blend gas product. The set all steps to air only option 1316 sets all steps for only an air gas product. The set all steps to ozone option 1318 sets all steps for only ozone and oxygen gas product. The set all steps to oxygen option 1320 sets all steps for only an oxygen gas product. The previous option 1322 navigates back to a previous user interface.

FIG. 14 shows an example system status user interface 1410, which can be activated, for example, from the main menu user interface 910 of FIG. 9. The system status interface 1410 shows a pictorial representation of a system process and instrumentation diagram 1412, indicating what components of the remediation system 110 are currently in operation and can provide to current operating conditions (e.g., flow information and/or back pressure). This allows a user to quickly view flows and pressures for wells being fed by the remediation system 110. For example, only active components might be displayed in some instances, while in other instances active components can be displayed by a solid background, while in still other implementations active components can be designated through other methods, such as differences in color, gray scale, size, flashing, or other such designations.

The representation depicted in FIG. 14 identifies, in addition to the active components, a currently active treatment step 1414, and shows the oxygen compressor 332, the oxygen concentrator 338, the flow meter 362, a gauge and/or other sensing device 364, the ozone generator 350, the backpressure regulator 352, the ozone delivery pump 354, the air compressor 312, the distribution manifold 122 and an active valve 126. In some instances the system status interface further identifies a gas flow rate 1416, a back or sparge pressure 1418, a currently operating valve 1419, an ozone concentration and/or ozone production set point 1420 (as defined in the step configuration), a time remaining 1422 in the dwell time for the active step, the internal unit operating temperature 1424, and/or other such relevant conditions, operating parameters and/or statistics.

FIG. 15 shows an example utilities user interface 1510, which can be activated, for example, from the main menu user interface 910 of FIG. 9. The utilities user interface provides the user with access to utilities available through the remediation system 110. For example, the utilities interface includes a field logging menu option 1512 that can activate a field logging menu user interface (see FIG. 16) allowing the user to check the operation of the treatment schedule. The system override menu option 1514 activates a system override menu interface that allows a user to advance between individual treatment steps defined within the treatment schedule 510. The maintenance menu option 1516 activates a maintenance menu interface that provides information about maintenance for the remediation system 110 and/or components of the remediation system 110. The suspend mode menu option 1518 activates a suspend mode menu interface to define periods when the remediation system 110 is to be temporarily interrupted and cease operation. The set start lag option 1520 activates a set start lag interface that allows a user to set a start lag period of time. The set breakthrough delay option 1522 activates a set breakthrough delay interface that allows the user to define a set breakthrough delay period of time. The previous option 1524 returns to a previous user interface, while the more utilities option 1526 activates a subsequent utilities user interface providing a user with access to yet further utilities.

FIG. 16 shows an example of a field logging menu user interface 1610, and includes a step identifier 1612, a valve identifier 1614, a pressure measurement 1616, a flow rate 1618, a time remaining 1620 for the treatment step identified by the step identifier 1612, a start field logging option 1622, a stop field logging option 1624, a sequence advance option 1626, a set logging dwell option 1628 and a previous option 1630. The option for field logging is available to allow a user to temporarily suspend the treatment schedule in order to check flows and pressures of installed wells and/or system operations associated with each well in a relatively short period of time.

In activating a field logging mode a dwell time is set. The selection of the set logging dwell option 1624 displays, in some implementations, a numeric keypad or receives entries through another user interface such as a keyboard and a user can enter the number of minutes in the dwell period. The current dwell set time 1632 is displayed relative to the set logging dwell option 1628. In specifying a dwell period the duration is typically set for a sufficient period to allow time for the well casing to come up to normal operating conditions (e.g., typically 3 to 5 minutes) to provide accurate recordings of operating flows and pressures for each well. After a logging dwell is set, a selection of the start field logging option 1622 initiates the temporary treatment or sparging sequence. To advance to the next step in sequence before the dwell period has completed, the sequence advance option 1626 can be selected.

Again, the field logging user interface 1610 displays the currently active step 1612, the valve 1614 associated to that step, as well as the time remaining 1620 in the dwell period for that step. A selection of the stop field logging option 1624 ends the field logging sequence. If the user stops the field logging sequence in this way, the normal sparge cycle, in some implementations, is started again from the main menu user interface 910. Alternatively, the field logging will return the remediation system 110 to normal operation to implement the treatment schedule 510 upon completion of the field logging, if not stopped by the operator.

Figures 17, 18, 19, 20:
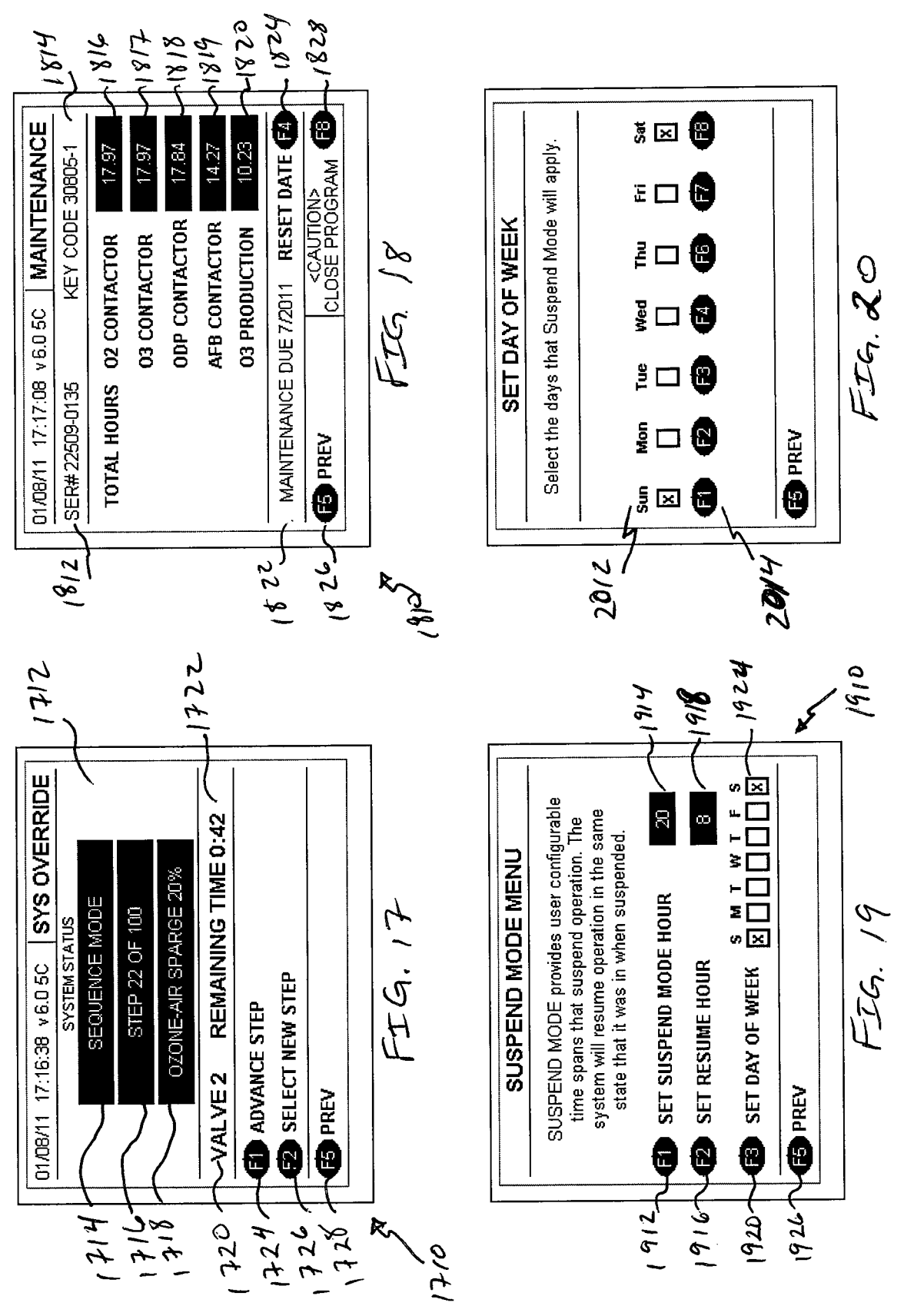

FIG. 17 depicts an example of a system override user interface 1710 that can be used to obtain status information and to skip from one step to another in the treatment schedule. This interface includes a system status field 1712 that provides a user with current system status information, such as but not limited to: a status 1714 that defines a system mode or status (e.g., sequence mode, field logging mode, alarms exist, suspend mode, off, no valves enabled, lag mode, breakthrough, zero dwell, or IOD override exists); an identification of a currently active step 1716; and a product type 1718 that is being delivered for the active step, and may also identify concentrations and/or percentages of gas product. A valve identifier 1720 can also be provided that corresponds to the currently active step and a time remaining 1722 of the active step. The system override user interface 1710 further includes an advance step option 1724 to skip to a next step in the treatment schedule, a select new step option 1726 to advance to any other step in the schedule where a keypad may be displayed in response to the selection of the new step option to allow the user to enter the step number, and a previous option 1730 activates a previously accessed user interface.

FIG. 18 depicts an example of a maintenance menu user interface 1810. This interface includes system identification information such as a serial number 1812 and/or key code 1814, a series of operating times 1816-1820 for various components of the remediation system 110, a due date for maintenance 1822, a reset date option 1824, a previous option 1826 and a close program option 1828. The maintenance menu user interface 1810 allows the user/owner to determine the run times of individual components of the remediation system 110 as well as alert them to the time when scheduled maintenance is due 1822.

In some embodiments, the maintenance menu user interface 1810, when displayed, may be preceded by a maintenance alert. For example, at six month intervals a maintenance alert may notify the user that scheduled maintenance is due on the remediation system 110. This notification, in some instances, can temporarily be closed, but typically will reappear, for example reappear in one day.

To reset the maintenance alert to the next 6-month interval a reset code can be obtained, which is typically specific to the remediation system 110, and can be obtained from the system supplier and/or a third party, and typically is based on the serial number 1812 and/or key code 1814. Selecting the reset date option 1824 and entering the reset code can reset the maintenance date and the system would then show the new maintenance due date and will not alert the user again until that date. In some implementations a new reset code is provided each time a user attempts to reset the maintenance alert. The close program option 1828 is provided in some embodiments and can allow adjustments to program settings.

FIG. 19 depicts an example of a suspend mode user interface 1910. This interface provides the user configurable time spans that suspend operation. Typically, the remediation system 110 resumes operation in the same state that it was in when suspended. Further, the suspend mode is an option for the user to be able to cease operation of the remediation system 110 for designated time periods, for example, a select number of hours on certain days of the week.

The suspend mode interface 1910 includes a set suspend mode hour option 1912 with a corresponding hour field 1914, a set resume hour option 1916 with a corresponding hour field 1918, a set day of the week option 1920 that allows a user to designate days of the week where suspension is to be implemented, days of the week indicators 1924 that identify for which days of the week suspension is defined, and a previous option 1926 that returns to a previous interface.

The suspend mode operates based on a 24 hour cycle. By selecting the set suspend mode hour option 1912, a keypad may prompt the user to select the hour at which the remediation system 110 will suspend operation on the days indicated. After setting the suspend hour, the set resume hour option 1916 allows the user to select the time for the remediation system 110 to come back on. For example, suspend time is defined as hour 20 and the resume time is defined as hour 8, the remediation system 110 suspends operation at 8 PM on Saturday, resume at 8 AM on Sunday, suspend at 8 PM on Sunday, and resume again at 8 AM on Monday. The suspend mode does not disrupt the normal treatment schedule, so the remediation system 110 will continue remediation on the treatment steps that were active when the remediation system 110 went into suspend mode. The select day of the week option 1920 activates a subsequent set day of the week interface to allow the user to select appropriate days.

FIG. 20 depicts an example of the set day of the week interface 2010 to be used with the suspend mode. This interface prompts the user to choose the days of the week during which the suspend mode will be active, identifies the seven days of the week 2012 and includes options 2014 associated with each day, where the selection of a day option toggles the corresponding day from a non-suspend state to a suspend state. After the suspend mode days are configured, the selected days will appear in the suspend mode menu user interface 1910.

FIG. 21 depicts an example of a set start lag user interface 2110 according to some embodiments. As introduced above, after a cycle through a treatment schedule completes and before the treatment schedule is repeated, a lag period can be implemented. This lag period can be implemented to allow the geological formation to accept the gas product and/or allow the gas product to penetrate the formation. With some geological formations a lag time may not be needed or is relatively short (e.g., with some sand formations). Further, a lag period may be implemented in some instances to allow the various components of the system to, in part, cool down between restarting a schedule treatment, as cooling systems (e.g., fans and/or air conditioning) remain on, when relevant, during a lag mode defined. The set start lag option 2112 activates the lag time field 2114 to enter the lag time (which may be set to a default lag time). In some instances, a keypad is displayed in response to the selection of the set start lag option with a prompt to enter a lag duration. Some embodiments may impose a limit on the lag duration, for example, between 0 and 480 minutes.

FIG. 22 depicts an example of a set breakthrough delay user interface 2210 according to some embodiments. The breakthrough delay provides a user configurable delay before entering breakthrough mode when manifold pressure is greater than or equal to a threshold pressure. Depending upon which gas product is selected, a breakthrough delay can be defined. For example, when the air gas product is delivered to the distribution manifold, the air source system 114 can be implemented with a compressor that can generate pressures of 100 psi or more. This relatively large pressure can be utilized with geological formations that take a relatively long time to develop so that the gas product can penetrate into the formation. When pressures exceed a threshold the system enters the breakthrough mode (e.g., in excess of 50 psi). The breakthrough mode may limit the dispersion of one or more of the gas products until the well pressure drops to within pressure thresholds associated with the gas product. In some embodiments, the air source system 114 is used during the breakthrough mode to develop the geological formation until the pressure drops. Once the pressure drops other gas products can be delivered to the well. This breakthrough mode can be implemented automatically based on the measured parameters.

The breakthrough delay user interface 2210 includes a set delay option 2212, and breakthrough delay time field 2214 and a previous option 2216. A breakthrough mode occurs when a well being treated (e.g., sparged into) has been at a pressure at or greater than a threshold (e.g., 50 psi) for a set threshold period of time, which can be referred to as the breakthrough delay. After this delay period has passed and the pressure has not dropped below the threshold, the remediation system 110 enters a breakthrough mode. Upon selecting the set delay option 2212 the user can define the period, for example directly into the delay time field or a keypad may be displayed prompting the user to enter a delay value. Again, some embodiments may impose limits, such as delay limits of between 3 and 600 seconds.

FIG. 23 depicts an example of a more utilities user interface 2310 according to some embodiments. This interface allows a user to access additional utilities relative to the operation of the remediation system 110 and/or parameters relative to operation of the system. The more utilities interface 2310 includes a set date and time option 2312 that allows the user to set the time and date, a set air conditioning and heat option 2314 that allows a user to specify temperature thresholds or set points that cause an activation or deactivation of one of a heater and an air conditioning unit when the thresholds are met, a view internal ozone sensor history 2316 that can be used to assist in diagnosing internal ozone leaks, a manual drain O2 option 2318 that is used to diagnose and test the drain of the water separator of the oxygen source system 115, a manual drain AFB option 2320 that is used to diagnose and test the drain for the water separator of the air source system 114, an add/remove step option 2322 and a previous option 2324. The set date and time option can activate a set date and time user interface that allows a user to set the time and/or date to correspond to the local time zone. The remediation system 110 can use the clock to time stamp alarm events, data collected, logs, conditions and the like, which can be helpful in troubleshooting issues and/or possible future issues, and in generating reports and/or displaying information.

FIG. 24 depicts an example of an internal ozone sensor history user interface 2410 according to some embodiments. Again, this interface can be used to assist in diagnosing internal ozone leaks. An ozone sensor is linked to a live output display that can be viewed from the utilities menu. The internal ozone sensor history interface 2410 displays a graphical representation 2412 over a period of time of the detected concentrations of ozone gas in and/or proximate the remediation system 110. For example, a ten minute live window can be displayed for the sensor input, and an ozone level (e.g., from 0 to 2 ppm).

FIG. 25 depicts an example of an add or remove sequence steps user interface 2510 according to some embodiments. The add or remove sequence steps user interface includes a select valve for new step option 2512 that allows the user to add an additional step in the sparge sequence. As described above, substantially any number of steps can be included. Some embodiments, however, may impose a limit, such as up to 100 total steps. Selection of the select valve for new step option 2512 prompts the user to enter a valve number or identifier (e.g., through a keyboards, keypad, displayed keypad or the like). A delete the last step option 2514 is included that allows a user to delete one or more steps. A configuration option 2516 is included that activates the configuration user interface, such as interface 1110. A previous option 2518 returns the user to a previous user interface.

FIG. 26 depicts an example of a total hours user interface 2600. The total hours interface include a listing of hours 2601 organized by valve number 2602. I some embodiments, the hours are further specified by a total number of hours 2603 and by gas product delivered, such as ozone hours 2604, oxygen hours 2605 and air hours 2606.

An accumulator is used to track the number of hours for each valve that has delivered and/or sparged a certain type of gas product. In some implementations, the time accumulated is not based off of the user set treatment schedule, but rather the actual production state for a particular valve. For example, if the remediation system 110 regresses from producing ozone to producing only oxygen due to an alarm condition, the accumulator reflects both the time spent injecting ozone as well as the time spent injecting oxygen.

The total hours interface 2600 further includes an up option 2612 a down option 2614 to scroll up and down line by line, a page down option 2616 and a page up option 2618 to scroll through screens, a previous option 2620 to return to a previous user interface, a history option 2622 that activates a history user interface that shows previously measured flow rates and pressures for an individual valve. In some instances the number of previously measured flow rates and/or pressures are limited, for example, the last 10 recorded flow rates and pressures for an individual valve. In other implementations, however, further measurements can be viewed, for example by scrolling.

The total hours interface 2600 additionally includes a reset option 2624 that allows a user to reset an individual valve run time by scrolling over or selecting the valve in this hours list 2601 and selecting the reset option 2624. In some instances, a warning screen interface is displayed, which may request the user to confirm the reset. Similarly, a reset all option 2626 is provided that causes a reset of all valve run times. Again, a warning screen may be displayed and the user requested to confirm the reset.

FIG. 27 depicts an example of a history user interface 2710 that can be activated from the total hours user interface 2600 as describe above. Again, the history user interface 2710 shows previously recorded flow rates 2712 and pressures 2714 for an individual valve 2716. In some embodiments, the history user interface may limit the number of measurements, for example, to the last 10 recorded flow rates and pressures for a particular valve. A user can navigate through the history valves by selecting a reverse option 2720 or a forward option 2722 to move backwards or forwards through the screens, respectively. A user may return to the total hours user interface 2600 by selecting the previous option 2724.

FIG. 28 depicts a warning user interface 2810 that is activated in response to a user selecting to reset hours associated with a selected valve by selecting a reset option 2624 from the total hours user interface 2600. The warning user interface requests the user to confirm the instruction to reset by selecting a reset option 2812 from the warning user interface 2810. The warning user interface can further include a previous option 2814 that returns to the total hours user interface 2600 upon selection. A similar warning user interface can be generated in response to a selection of the reset all option 2626 on the total hours user interface 2600 as described above.

FIG. 29 depicts an example of an alarm menu user interface 2910. This interface includes an alarm listing option 2912, a clear all IOD overrides option 2914, an alarm legend option 2916 and a previous option 2920 that returns the user to a previous user interface. When an alarm occurs it is logged in an alarm list identifying the type of alarm and when it took place. The alarm list option 2912 activates an alarm listing user interface that identifies the alarms that occurred.

Selection of the clear all IOD overrides option 2914 re-enables one or more valves that have been disabled from the sparge sequence when an internal ozone alarm has occurred. A warning banner or user interface may be generated, similar to warning interface 2810 of FIG. 28, and may further request the user to acknowledge the request to re-enable (e.g., a clear all option may be displayed).

The alarm legend option 2916 can activate the system to display a legend listing interface that lists alarm legends or abbreviations. For example, the following alarm legends may be displayed: "The first numeric value indicates Alarm Number," "+Alarm has NOT been Acknowledged," "HP High Pressure on Valve nn," "OD Internal Ozone detected while valve nn is active," "RO Remote Ozone detected while valve nn is active," "LP Low Pressure on side A, B, C or D," "PL Power Loss on fuse/breaker nn," "ES E-Stop pressed while valve nn is active," "HT High Temp shutdown while valve nn is active," "LT Low Temp shutdown while valve nn is active," "BT Break Through mode on Valve nn," "RS Remote Shutdown on Valve nn," "OP Ozone Production fault when valve nn was active," "AF Analog Fault on transmitter nn. Transmitters: 1-Pressure 2-Flow 3-O3 4-Temperature," "NE No Eligible Valves," and "The last numeric value indicates manifold pressure."

FIG. 30 depicts an alarm list user interface 3010 that includes a list of alarms 3012 that have occurred. Each alarm is listed by an alarm line 3014 that displays information from left to right, starting with the alarm number in the list, the alarm type (as seen in the Alarm Legend), the valve number that was active when the alarm occurred, the date, the time, and operating pressure at which the alarm occurred. The alarm list interface 3010 further includes an up option 3016 and a down option 3018 to proceed through individual listings, a page up option 3020 and a page down option 3022 to proceed through pages. A previous option 3024 can be used to return to the previous menu. A user can select an acknowledge option 3026 to acknowledge an alarm, which in some embodiments returns the remediation system 110 to the state at which it was running previous to the occurrence of the alarm condition. In some instances, if the alarm state is still present when acknowledging the given alarm, the alarm will appear again as a second instance, with the time and date stamp that occurred when the alarm had attempted to be acknowledged. In the alarm list, the "+" symbol after the alarm number indicates that an alarm has not been acknowledged. In some embodiments, an operator can clear a single alarm from the list by scrolling over the alarm with the navigation keys and pressing the clear option 3028. When an alarm is cleared from the alarm list, it is considered to be acknowledged, but will also be cleared from the list. To clear all alarms, an operator can select a clear all option 3030.

Figure 31:
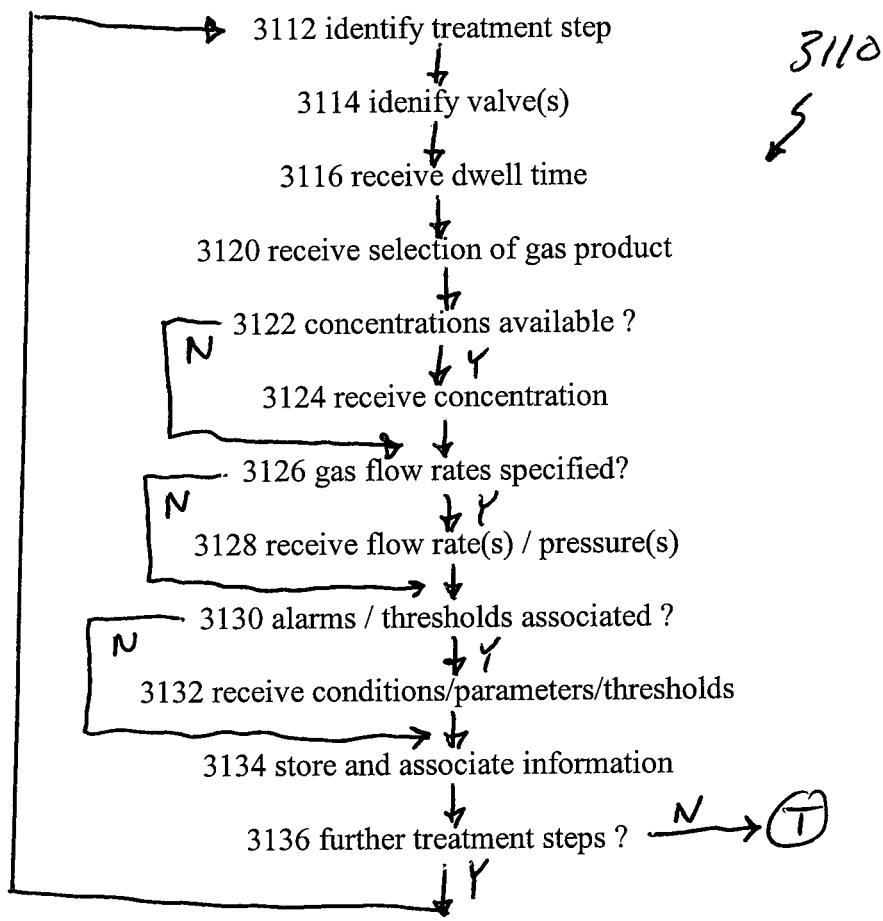
FIG. 31 depicts a simplified flow diagram of a process for use in setting up and/or defining a remediation treatment schedule according to some embodiments.

FIG. 31 depicts a simplified flow diagram of a process 3110 for use in setting and/or defining a remediation treatment schedule, program or sequence 510 according to some embodiments. In step 3112, a treatment step to be defined and/or configured is identified. In step 3114, an identification of one or more valves to be associated with the first treatment step is received (e.g., received following the selection of the set valve option 1122 on the configuration selection user interface 1110). In step 3116, a dwell time or a duration is received (e.g., specified by a user in response to a selection of the set dwell option 1124).

In step 3120, a selection is received of a gas product type to be delivered to the identified valve when the step is active (e.g., set product type option 1126). In step 3122, it is determining whether various concentrations for the selected gas product are available. In those instances where various concentrations are not available the process advances to step 3126. Alternatively, step 3124 is entered where a concentration and/or gas product configuration is received. As described above, in some instances a pull down menu may be provided, a user my designate or select a percentage concentration (e.g., set O3 output option 1130), a user may be provided with the capability to specify concentrations and/or configures for one or more selected gas products.

In step 3126, it is determined whether gas flow rates and/or pressures can be specified for one or more gases to be provided in generating the selected gas product, and/or a gas flow rate and/or pressure of the selected gas product. When one or more gas flow rates and/or pressures can be designated step 3128 is entered to receive the defined flow rates and/or pressures. Again, pull down menus may be provided, users may select from a listing, a user may manually enter the desired flow rates and/or pressures or the like. In some instances a verification may be preformed to confirm that the gas product and/or gases can be supplied at the designated flow rates and/or pressures while still achieving the intended remediation. This verification may be skipped or reduced when a user select from a listing or pull down menu as the options may be limited by system parameters, flow rates and/or pressures of other gases and/or the gas product, and other such factors.

In step 3130, it is determined whether alarms and/or thresholds are to be associated with the step. This allows a user to specify parameter of operation associated with the treatment step being configured. For example, a user my designate a minimum flow rate, a minimum pressure or other such factors. Further in some embodiments, a user may specify a regression strategy, when a user is provided with the capability to define regression strategies. Similarly, a user may be able to override a regression strategy (e.g., prevent any further gas product delivery for a selected valve when any alarm condition occurs, such as when the selected gas product is an ozone, oxygen and air gas product the regression strategy override may prevent any gas product, including just oxygen or just air, from being delivered in the event an alarm event occurs that inhibits the delivery and/or generation of ozone gas). When a user is not designating alarms and/or threshold the process advances to step 3134.

In step 3132, alarm conditions, parameters, thresholds and/or settings are received. For example one or more user interfaces can be displayed allowing users to select conditions, alarms, parameters, threshold and the like. In step 3134, the specified information is stored and associated with the identified treatment step. In step 3136, it is determined whether further treatment steps are to be defined. When no further treatment steps are to be defined the process 3110 terminates. Alternatively, the process returns to step 3112 to identify a subsequent treatment step.

Some embodiments provide a similar process for amending one or more treatment steps of the treatment schedule 510. For example, step 3112 can be replaced with a process step of receiving a selection of one or more treatment steps already configured and defined within a treatment schedule. The process would continue with respect to receiving modifications, deletions or accepting previously defined parameters. In some implementations, some or all of the process 3110 can be implemented through the user interfaces as described above. In other instances the schedule can be created remote from the remediation system 110 and uploaded or otherwise communicated to the remediation system.

Figure 32:
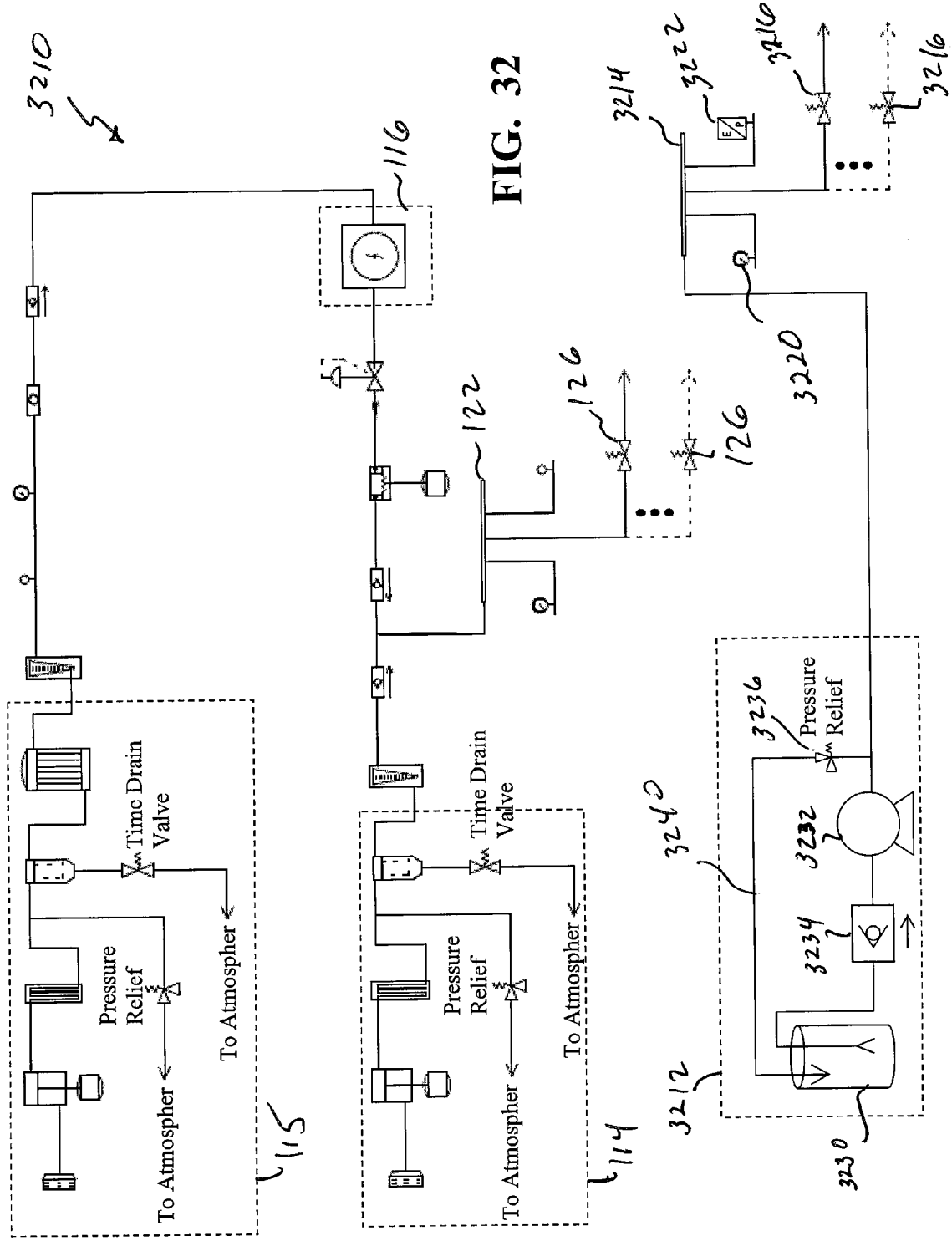
FIG. 32 depicts a simplified block diagram of a remediation system according to some embodiments.

FIG. 32 depicts a simplified block diagram of a remediation system 3210 according to some embodiments. Similar to the remediation systems 210 and 310 of FIGS. 2 and 3, respectively, the remediation system 3210 includes an air source system 114, an oxygen source system 115, an ozone source system 116, the distribution manifold 122, one or more valves 126 and the remediation controller 112 (not shown in FIG. 32). Further, the remediation system 3210 includes one or more liquid product sources system 3212 that is also cooperated with the remediation controller 112 to deliver one or more liquid products or substrates to the same or separate wells. Some embodiments include a separate liquid manifold 3214 with separate valves 3216. The separate liquid manifold 3214 can optionally include additional measure devices, such as one or more gauges 3220, pressure transmitters 3222. The valves 3216 can be cooperated with the same delivery units 124 that receive the gas products or separate delivery units 124 to distribute the liquid product. Further, a separate deliver unit may be included within a well where a gas delivery unit is positioned and/or positioned within separate wells.

The liquid product source system 3212 includes one or more reservoirs 3230 to house one or more liquid products and one or more liquid pumps 3232 to deliver the one or more liquid products to the manifold 122 and/or liquid manifold 3214. Some embodiments may include one or more check valves 3234, pressure relief valves 3236, a liquid product feedback path 3240, and other components such as gauges, flow meters and/or other such relevant components.

In operation the treatment schedule can similarly specify the delivery of one or more liquid products instead of or in addition to one of the gas products. Typically, when a single delivery unit 124 is employed to deliver both a gas product and liquid product the delivery unit is limited to one of the liquid product or the gas product. The liquid product delivered can be substantially any relevant liquid product, such as but not limited to hydrogen peroxide, persulfate, permanganate, Fenton's reagent and other such products. In some implementations, the liquid product is dispersed prior to a gas product being dispersed from the same well. Further, in positioning the dispersion devices 134 for a liquid delivery unit 124 and a gas delivery unit 124 positioned within the same well, the liquid dispersion device is often positioned higher and closer to the surface than the gas dispersion device (e.g., a separation of about 3-5 feet).

Figure 33:
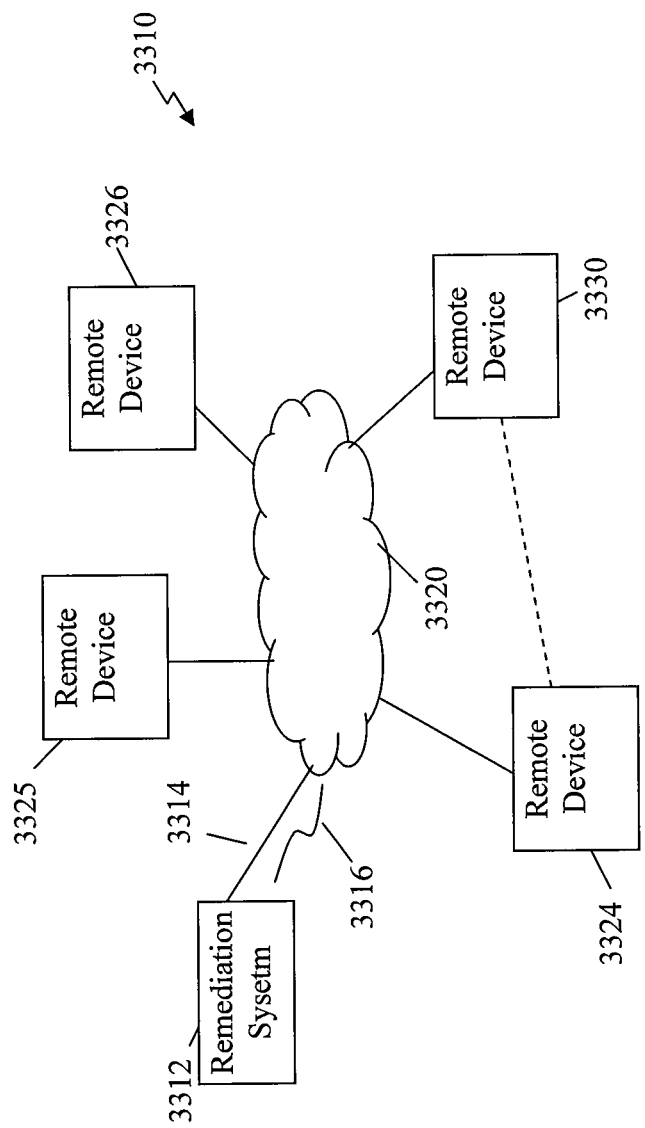
FIG. 33 depicts a simplified block diagram of a system that can implement remediation.

FIG. 33 depicts a simplified block diagram of a system 3310 that can implement remediation. The system includes one or more remediation systems 3312, which can be similar to the remediation systems 110, 210, 310, 3210 that is positioned at a site to be treated. The remediation system 3312 can connect, via wired 3314 or wirelessly 3316, with a distributed network 3320, such as the Internet, a satellite communication network, a cellular network or other such networks or combinations of such networks. One or more remote devices 3324-3326 can communicate with the remediation system 3312 over the distributed network 3320. For example, a one or more of the remote devices 3324-3326, which may be computers, servers, handheld computing devices or other such devices, can communicate with the remediation system 3312 to receive history data, log data, operating parameters and/or conditions, alarms, notifications and other such information. Further, in some implementations, the remote 3324 device can configure a treatment schedule and/or alter an existing treatment schedule. In some instances, a first remote device 3324 may similarly communication directly with or over a distributed network 3320 with a fourth remote device 3330 that is not authorized and/or capable of communicating with the remediation system 3312. As such, the fourth remote device 3330 may obtain some or all of the information that the first remote device 3324 can obtain from the remediation system 3312. For example, the fourth remote device 3330 may access an Internet or web site hosted by the first remote device, or a third party source that can communicate with the first remote device, to access information relevant to the remediation system. Additionally, in some implementations the remote device 3324 may be able to provide information, programs, updates, upgrades and the like to the remediation system 3312.

In implementing the remediation treatment schedule some embodiments identify the schedule and a step with the schedule. One or more valves are identified that are associated with the step, and for each of the one or more valves it is determined whether the valve is enabled. Remediation is skipped, at least for the identified step, for each of the one or more valves that are not enabled. If no valves are enabled for the identified step a subsequent step as defined in the schedule is identified and one or more valves for that step are similarly identified and evaluated to determine whether they are enabled.

When a step has enabled valves a further determination can be made to determine whether alarm condition exist that may prevent or limit implementing the remediation relative to the currently active step. When alarm conditions exit it can further be determined whether one or more alarm conditions prohibit implementation of the step. In some instances where an alarm prohibits implementation of a step it can be determined whether regression steps can be implemented relative to the currently active step and the valve or valves being considered. When regression can be implemented such regression is identified and implemented. Some embodiments track and/or log such regression and/or the actual amount of reactant, oxidant and the like that is delivered to the geological formation.

The present embodiments provide the ability to continually generates, at the site where remediation treatment is being implement, and delivers one of five different gas products and/or additionally can provide one or more liquid products. Further, some embodiments generate and deliver 90 to 94% purity oxygen to the formation sequentially to a sparge well through a microporous diffuser apparatus. Additionally, the present some embodiments do not need to store the purified oxygen, and in some applications does not sparge in banks of sparge wells.

Furthermore, the present embodiments are capable of generating and implementing a sparge process, such as an oxygen sparge process, that sparges at flow rates that can exceed 0.5 CFM per sparge well, and in some instances that sparge, for example, at 0.5 to 4 CFM per sparge well, which is significantly greater than systems that have limited capabilities of about 0.1 to 0.2 CFM per well (multiple wells simultaneously). The present embodiments can deliver a higher volume of gas to the vadose and saturated contamination zone within the geological formation through a microporous diffuser apparatus. The sparge process can deliver an air gas product, an oxygen gas product with a purity of 90 to 94%, an air and oxygen gas product with a purity of 35 to 45%, an ozone and oxygen gas product, and a air, oxygen and ozone gas product from the same system to any sparge well within the treatment schedule. Still further, the five different gas products can be generated locally at the site being treated.

In addition, some embodiments generate and deliver the oxygen and ozone gas product and air, oxygen and ozone gas product to implement a sparge gas process with a higher ozone concentration in each sparge gas mixture than seen in other systems. The ozone gas concentration can further be controlled and/or adjusted to deliver multiple varying concentrations to the same sparge well and/or to multiple different sparge wells. The use of the PVDF (Kynar®) microporous diffuser apparatus, in part, allows for a higher ozone gas concentration to sparge into the soil formation. The high ozone gas concentrations often degrade other types of plastic devices, such as those made from high density polyethylene. Further, multiple combinations of the oxygen and ozone gas, and air, oxygen and ozone sparge gasses can be applied to the same sparge well. In some embodiments, the generated ozone gas concentration within the mixed air, oxygen and ozone gas product is between about 0.5% to 3% (or about 3250 parts per million by volume (PPMV) to 19,500 PPMV). Further, the ozone gas concentration can be varied (e.g., 10 to 100% of output) to each individual sparge well or to the same sparge well within a treatment schedule.

Some embodiments provide methods of implementing remediation of contaminants. These method comprising: identifying a remediation schedule; identifying, within the remediation schedule, a first remediation step to be implemented; identifying, as defined by the remediation schedule and corresponding to the first step, a first gas product of five different gas products that are locally generated and locally available at a site being treated; generating, locally at the site being treated and in response to identifying the first gas product as defined in association with the first step, the first gas product; and delivering, below ground level and in response to generating the first gas product, the first gas product to an area being treated.

Other embodiments provide methods of remediation of contaminants. These methods comprise: delivering, below ground level and through one or more wells, one of five available and different gas products to a soil region proximate one or more contaminants to be treated; and cycling through a schedule of treatment steps to control the delivery of one or more of the five different gas products. In some instances the cycling through the schedule of treatment steps comprises: identifying a treatment schedule that defines the cycling of the treatment steps and which of the five different gas products is to be delivered with each of the treatment steps; detecting a first impediment to implementing a first step and delivering a first gas product of the five different gas products as defined by the treatment schedule; and implementing a regression strategy comprising: halting the delivery of the first gas product; identifying a second gas product of the five different gas products, where the second gas product is different than the first gas product; and overriding the treatment schedule and continuing to implement the first step while delivering the second gas product in place of the first gas product. Further, the identifying the second gas product can, in some implementations comprise: identifying the first impediment; and identifying the second gas product such that the first impediment is isolated and does not interfere with the delivery of the second gas product. Additionally or alternatively, the identifying the first impediment can comprise identifying a problem with an ozone product source, wherein the first gas product comprises a mix of a plurality of gas products including ozone gas and oxygen gas; and the identifying the second gas product comprises identifying the second gas product that comprises oxygen gas and does not include ozone.

Further embodiments provide methods of remediating soil and/or groundwater. These methods comprise: identifying a first gas product of five different and locally available gas products to be delivered in treatment, where each of the five different gas products are to be generated locally at a geographic location to be treated; generating, locally at the geographic location being treated, the first gas product; delivering, below ground level and through one or more wells, the generated first gas product to a soil region proximate one or more contaminants to be treated; and cycling through a series of activation steps to generate and control the delivery of one or more of the five different gas products to the geographic location. The cycling through the series of the activation steps can further comprise: varying concentrations of two or more gases within the first gas product between two activation steps. Additionally in some implementations, the cycling through the series of the activation steps comprises varying concentrations of two or more gases within the first gas product delivered through a first well between two sequential activation steps of the first well. With some embodiments the cycling through the series of the activation steps comprises initiating an additional activation step; generating, locally at the geographic location and in response to initiating the additional active step, a second gas product; and delivering the second gas product, that is different than the first gas product, to a second well, where the additional activation step occurs between the two sequential activation steps at the first well. Further, the five different gas products in some embodiments comprise: air; oxygen; air and oxygen; oxygen and ozone; and air, oxygen and ozone. Further with some implementations, the cycling through the series of activation stages comprises: activating a first cycle and delivering a first gas products comprising a first gas at a first concentration and a second gas at a second concentration; activating a second cycle and delivering the first gas product with varied concentrations such that the first gas has a third concentration while the second gas has a fourth concentration.

Yet other embodiments provide contaminant remediation of soil and/or ground water. These methods comprise: cycling through a series of scheduled steps that control delivery of one or more of five different and available gas products to a geographic area being treated; and delivering, during each activation stage and through one or more wells within the geographic area, one of the five available and different gas products to soil within the geographic area and proximate one or more contaminants to be remediated. The cycling through the series of activation stages can further comprise: initiating a first activation stage, and delivering a first gas product; and initiating a second activation stage that is subsequent to and immediately follows the first activation stage, and delivering a second gas product of the five available gas products that is different than the first gas product.

In some implementations delivering the first gas product comprises delivering the first gas product to a first well; and delivering the second gas product comprises delivering the second gas product to a second well that is separate from the first well. In other implementations delivering the first gas product comprises delivering the first gas product to a first well; and delivering the second gas product comprises delivering the second gas product to the first well. Furthermore, the delivering the first gas product comprises generating the first gas product as the geographic location.

Some embodiments further comprise: generating each of the one or more of the five different and available gas products at the geographic location in response to initiating each of the activation stages. Additionally, the generating each of the one or more of the five different and available gas products can comprise compressing and drying air to generating a first product. Further, the generating each of the one or more of the five different and available gas products can comprise compressing air and purifying oxygen from the compressed air to generate a second product. In some instances generating each of the one or more of the five different and available gas products comprises combining the compressed air with the purified oxygen to generate a third product consisting of air and purified oxygen. Alternatively or additionally, generating each of the one or more of the five different and available gas products can comprises purifying oxygen from air and generating ozone from the purified air to generate a fourth product comprising ozone and purified oxygen, where in some instances the purified oxygen has a purity of greater than 85%. The generating each of the one or more of the five different and available gas products can additionally or alternatively comprise combining the compressed air with the purified oxygen and ozone to generate a fifth product comprising the air, the purified oxygen and the ozone.

Some embodiments provide systems for use in remediating contaminants. These embodiments comprise: a plurality of product sources; a distribution manifold coupled with the plurality of product sources; a plurality of diffuser coupled with and distributed over the distribution manifold, wherein each diffuser is positioned within a separate well within the soil proximate an area to be remediated; and a controller coupled with the plurality of product sources and the distribution manifold, wherein the controller: communicates with one or more of the product sources to produce one or more of five different products to the distribution manifold in accordance with a sequence; and communicates with the distribution manifold to direct the one of the five different products to a predefined one of the diffuser in accordance with the sequence. In some implementations these systems further comprise: an ozone delivery pump that boosts a delivery pressure of a gas product that comprises ozone to a level to overcome backpressure induced by the geological formation such that the gas product is delivered to the geological formation such that the gas product disperses into the geological formation. The plurality of product sources can comprise: an air compressor coupled with the distribution manifold, where the air compressor generates compressed gas as a first product; an oxygen purifier coupled with the air compressor and the distribution manifold, wherein the oxygen purifier receives air from the air compressor and produces purified oxygen as a second product; and an ozone generator coupled with the oxygen purifier and the distribution manifold, wherein the ozone generator receives the purified oxygen and produces a mixture of ozone and oxygen as a third product.

Additionally or alternatively, the controller can activate the air compressor and the oxygen purifier to deliver a mixture of oxygen and air, as a fourth product, to the distribution manifold. Similarly, the controller can activate the air compressor and the ozone generator to deliver a mixture of oxygen, ozone and air, as a fifth product, to the distribution manifold. In some embodiments the controller activates the air compressor to deliver the first product to a first diffuser in a first well, subsequently and sequentially activates the oxygen purifier to deliver the second product to a second diffuser in a second well, subsequently and sequentially activates the ozone generator to deliver the third product to a third diffuser in a third well, subsequently and sequentially activates the air compressor and the oxygen purifier to deliver the fourth product to a fourth diffuser in a fourth well, and subsequently and sequentially activates the air compressor, the oxygen purifier and the ozone generator to deliver the fifth product to a fifth diffuser in a fifth well in accordance with the predefined sequence. In some embodiments the air compressor comprises: a first sub-compressor coupled with the oxygen purifier to deliver compressed air to the oxygen purifier from which the oxygen purifier produces the purified oxygen; and a second sub-compressor coupled with the distribution manifold to deliver compressed air directly to the manifold to be mixed to produce the first, fourth and fifth products. Further, each of the first and second sub-compressors can comprise a compressor, a cooler and a water separator. A user interface is also included in some embodiments, where the user interface displays options and receives the sequences or treatment steps of a treatment schedule as entered by a user through the user interface.

Other embodiments provide methods of removing contaminants from a soil formation. These methods comprise: activating a remediation treatment schedule to remediate contaminants within a soil formation, where the treatment schedule comprises a plurality of treatment steps; and sequentially implementing each of the plurality of treatment steps, comprising for each step: identifying, in accordance with the step of the treatment schedule, one gas product of five different gas products to be delivered to the soil formation; generating, in response to the identifying the one gas product and at the geographic location of the soil formation, the one of the five gas products; and delivering the generated one gas product as defined by the treatment step being implemented. In some instances the sequentially implementing each of the plurality of treatment steps comprises: implementing a first treatment step, comprising: the identifying the one gas product comprises identifying, in accordance with the first step, a first gas product of the five different gas products to be delivered to the soil formation as defined by the first step; the generating the one gas product comprises generating, in response to the identifying the first gas product, the first gas products; and the delivering the generated one gas product comprises delivering the generated first gas product as defined by the first treatment step being implemented; and implementing a second treatment step, comprising: the identifying the one gas product comprises identifying, in accordance with the second treatment step, a second gas product of the five different gas products to be delivered to the soil formation as defined by the second treatment step, where the second gas product is different than the first gas product; the generating the one gas product comprises generating, in response to the identifying the second gas product, the second gas products; and the delivering the generated one gas product comprises delivering the generated second gas product as defined by the second treatment step being implemented.

With some embodiments delivering the first gas product to the soil formation can comprise delivering the first gas product to a first well formed within the soil formation; and the delivering the second gas product to the soil formation can comprises delivering the second gas product to the first well. Further, the sequentially implementing each of the plurality of treatment steps can comprise: implementing a third treatment step, comprising: the identifying the one gas product comprises identifying, in accordance with the third treatment step, a third gas product of the five different gas products to be delivered to the soil formation as defined by the third treatment step; the generating the one gas product comprises generating, in response to the identifying the third gas product, the third gas products; and the delivering the generated one gas product comprises delivering the third gas product, as defined by the third treatment step, to a second well formed within the soil formation where the second well is different than the first well. In other instances delivering the first gas product to the soil formation can comprise delivering the first gas product to a first well formed within the soil formation; and delivering the second gas product to the soil formation can comprise delivering the second gas product to a second well formed within the soil formation where the second well is different than the first well.

Further embodiments provide methods of defining a soil remediation treatment. These methods comprise: identifying a plurality of treatment steps; receiving, in association with each of the plurality of treatment steps, a selection of one of five different gas products to be delivered to a soil formation to be treated; receiving, in association with each of the plurality of treatment steps, a dwell time during which the selected one of the give gas products is to be distributed to a soil formation; and generating a treatment schedule comprising each of the plurality of treatment steps, and for each treatment step associating the selection of the one gas products and the received dwell time.

In some instances the receiving the selection of the one gas product can comprise receiving a concentration of the one gas products such that the one gas product is a mixture of a plurality of gas streams; and wherein the associating the selection of the one gas product comprises defining the concentration of the one gas product. Some methods further comprise: receiving, in association with each of the plurality of treatment steps, a designation of one of a plurality of valves through which the one gas product is to be distributed to the soil formation; and generating the treatment schedule comprises associating, for each treatment step, the designation of the one valve through which the one gas product is to be distributed to the soil formation. Additionally or alternatively, the receiving the selection of the one gas product can, in some embodiments, comprise receiving, in association with a first treatment step, a concentration of a first gas product where the first gas product is a mixture of a plurality of gas streams; and the generating the treatment schedule can comprise associating the first treatment step with the first gas product and the concentration of the first gas product.

Additionally embodiments provide methods of performing soil and/or ground water remediation. These methods comprise: initiating remediation; accessing a remediation or sparge schedule or sequence; identifying a valve as defined by the schedule; identifying one product of the five available products to be delivered to the valve as defined by the schedule; initiating delivery of the produce (in accordance with parameters as specified by the schedule (e.g., pressure; concentration levels; etc.)), which can include activating one or more relevant product sources; opening the valve; determining whether the product has been delivered for a predefined duration (or a predefined amount, e.g., by weight) as defined in the schedule; determining whether the schedule is complete; identifying a subsequent step when the schedule is not complete; determining whether a delay is to be implemented when the schedule is complete; wait for the delay period in response to determining that a delay period is defined; and again identifying a step defined in the schedule after waiting the delay period when the delay is defined.

Additionally, some of these methods comprise: identifying one or more product sources to be activated; activating the one or more product sources; identifying concentration levels as defined in the schedule (this can include identifying whether multiple product sources are to be active); identifying operating parameters for the one or more product sources to achieve the scheduled concentration levels (e.g., identifying levels of operation and/or pressures to be generated to achieve the scheduled concentration levels), for example based on array, look up table or the like; or opening valves to predefined levels to produce a product flow to achieve the desired product flow, while monitoring pressures and adjusting operating levels of the product sources to keep pressures within limits and maintain safe operation and achieve the desired product flow. Some embodiments further comprise: operating the one or more product sources; monitoring operating parameters/conditions and implementing adjustments as needed to stay within threshold limits of the operating parameters; determining whether one or more operating parameters has a predefined relationship with a threshold; activating an alarm; determining whether the condition dictates a temporary halt of the schedule; shutting down the one or more product sources; determining whether conditions have a second predefined relationship with an second threshold that corresponds to the first threshold; and reactive the one or more product sources While the invention herein disclosed has been described by means of specific embodiments, examples and applications thereof, numerous modifications and variations could be made thereto by those skilled in the art without departing from the scope of the invention set forth in the claims.

What is claimed is:

1. A system for use in remediating contaminants, the system comprising:
   a plurality of gas product sources positioned at a geographic location to be treated;
   a distribution manifold coupled with the plurality of product sources;
   a plurality of diffusers coupled with and spaced over the distribution manifold, wherein each of the diffusers is positioned within a separate well within the soil proximate an area to be remediated; and a controller coupled with the plurality of product sources and the distribution manifold, wherein the controller:
  activates one or more of the product sources to generate, locally at the geographic location, one of five different gas products in accordance with a first step of a treatment schedule; and
  communicates with the distribution manifold to direct the one of the five gas products to a predefined one of the diffuser in accordance with the treatment schedule;
wherein the plurality of product sources comprise:
  an air source system coupled with the distribution manifold, where the air source system generates a compressed air product as a first product;
  an oxygen source system coupled with the distribution manifold, wherein the oxygen source system generates a concentrated oxygen gas product as a second product; and
  an ozone generator coupled with the oxygen source system and the distribution manifold, wherein the ozone generator receives at least a portion of the concentrated oxygen gas product and produces, when active, a mixture of ozone gas and oxygen as a third product;
wherein the air source system comprises:
  a first air compressor configured to generate compressed air;
  an air cooler coupled with the first air compressor to receive the compressed air and wherein the air cooler is configured to cool the compressed air; and
  a water separator coupled with the air cooler, wherein the water separator is configured to receive the cooled compressed air and to separate out water from the cooled, compressed air producing dry, cool, compressed air as the first gas product;
wherein the oxygen source system comprises:
  a second air compressor configured to generate compressed air;
  a second air cooler coupled with the second air compressor wherein the second air cooler is configured to receive the compressed air and cool the compressed air from the second air compressor;
  a second water separator coupled with the second air cooler, wherein the second water separator is configured to receive the cooled, compressed air from the second air cooler and separate out water from the cooled, compressed air producing from the second air cooler; and
  an oxygen concentrator coupled with the water separator, wherein the oxygen concentrator is configured to receive the dry, cool, compressed air and separate out the oxygen to produce an oxygen gas product as the second gas product;
wherein the system further comprises:
  an oxygen purity meter configured to monitor oxygen purity of the oxygen gas product and to provide oxygen purity information to the controller regarding the measured purity information;
  wherein the controller is configured to track an amount of the one or more gas products delivered and make adjustments based on the received oxygen purity information.

2. A system for use in remediating contaminants, the system comprising:
  a plurality of gas product sources positioned at a geographic location to be treated;
  a distribution manifold coupled with the plurality of product sources;
  a plurality of diffusers coupled with and spaced over the distribution manifold, wherein each of the diffusers is positioned within a separate well within the soil proximate an area to be remediated; and
  a controller coupled with the plurality of product sources and the distribution manifold, wherein the controller:
    activates one or more of the product sources to generate, locally at the geographic location, one of five different gas products in accordance with a first step of a treatment schedule; and
    communicates with the distribution manifold to direct the one of the five gas products to a predefined one of the diffuser in accordance with the treatment schedule;
  wherein the controller is further configured to control the plurality of gas products sources such that the plurality of gas product sources collectively are configured to generate locally at the geographic location to be treated the five different gas products;
  wherein the controller is further configured to:
    identify, as defined in the treatment schedule and corresponding to a first step, a first gas product of the five different gas products to be generated and delivered to the geographic location;
    detect a condition that inhibits the delivery of the first gas product in accordance with the first step; and
    implement a regression strategy comprising:
      halting the delivery of the first gas product;
      identifying a second gas product of the five different gas products, where the second gas product is different than the first gas product; and
      overriding the treatment schedule and continuing to implement the first step while delivering the second gas product in place of the first gas product.

3. The system of claim 2, wherein the controller, in identifying the second gas product, is further configured to:
  identify a condition that inhibits the delivery of the first gas product; and
  identify the second gas product such that the condition is isolated and does not interfere with the delivery of the second gas product.

4. The system of claim 3, wherein the controller, in identifying the condition that inhibits the delivery of the first gas product, is further configured to:
  identify a problem with an ozone product source, wherein the first gas product comprises a mix of a plurality of gas products including ozone gas and oxygen gas; and
  identify the second gas product that does not include ozone.

5. The system of claim 2, further comprising:
  one or more liquid product sources;
  a liquid distribution manifold coupled with the one or more liquid product sources; and
  one or more liquid valves cooperated with the liquid distribution manifold configured to distribute one or more liquid products over some or all of the area to be remediated;
  wherein the controller further couples with the one or more liquid product sources and the one or more liquid valves, wherein the controller is configured to:
    activates at least one of the one or more liquid product sources to provide, locally at the geographic location, at least one liquid product in accordance with a second step of the treatment schedule; and
    controls at least one of the one or more liquid valves to direct the at least one liquid product to distribute the at least one liquid over some or all of the area to be remediated in accordance with the treatment schedule.

6. The system of claim 5, wherein the controller is configured to identify, in accordance with a first step of the treatment schedule, the one gas product of the five different gas products to be delivered to the soil formation;

cause the activation of the one or more of the gas product sources to generate, locally at the geographic location and in response to identifying the one gas product, the one of five different gas products; and cause the communicates of the one of the five different gas products to the distribution manifold to direct the one of the five different gas products to the predefined one of the diffuser in accordance with the treatment schedule.

* * * * *

UNITED STATES PATENT AND TRADEMARK OFFICE
CERTIFICATE OF CORRECTION

PATENT NO. : 8,540,457 B2
APPLICATION NO. : 12/705440
DATED : September 24, 2013
INVENTOR(S) : Moncrief, III et al.

It is certified that error appears in the above-identified patent and that said Letters Patent is hereby corrected as shown below:

On the TITLE PAGE:

First page, column 2, Item (56) OTHER PUBLICATIONS, line 1, delete "h20engineering" and insert --h2oengineering--.

First page, column 2, Item (56) OTHER PUBLICATIONS, line 2, delete "h20engineering" and insert --h2oengineering--.

First page, column 2, Item (56) OTHER PUBLICATIONS, line 3, delete "Enginnering," and insert --Engineering,--.

First page, column 2, Item (56) OTHER PUBLICATIONS, line 5, delete "H20 Engineering," and insert --H2O Engineering,--.

First page, column 2, Item (56) OTHER PUBLICATIONS, line 6, delete "h20engineering" and insert --h2oengineering--.

First page, column 2, Item (56) OTHER PUBLICATIONS, line 7, delete "H20 Engineering," and insert --H2O Engineering,--.

First page, column 2, Item (56) OTHER PUBLICATIONS, line 8, delete "h20engineering" and insert --h2oengineering--.

First page, column 2, Item (56) OTHER PUBLICATIONS, line 9, delete "H20 Engineering," and insert --H2O Engineering,--.

First page, column 2, Item (56) OTHER PUBLICATIONS, line 10, delete "h20engineering" and insert --h2oengineering--.

First page, column 2, Item (56) OTHER PUBLICATIONS, line 11, delete "H20 Engineering," and insert --H2O Engineering,--.

First page, column 2, Item (56) OTHER PUBLICATIONS, line 12, delete "h20engineering" and insert --h2oengineering--.

First page, column 2, Item (56) OTHER PUBLICATIONS, line 13, delete "H20 Engineering," and insert --H2O Engineering,--.

First page, column 2, Item (56) OTHER PUBLICATIONS, line 14, delete "h20engineering" and insert --h2oengineering--.

First page, column 2, Item (56) OTHER PUBLICATIONS, line 15, delete "H20 Engineering," and insert --H2O Engineering,--.

Signed and Sealed this
Twenty-ninth Day of April, 2014

Michelle K. Lee
*Deputy Director of the United States Patent and Trademark Office*

CERTIFICATE OF CORRECTION (continued)
U.S. Pat. No. 8,540,457 B2

First page, column 2, Item (56) OTHER PUBLICATIONS, line 16, delete "h20engineering" and insert --h2oengineering--.

First page, column 2, Item (56) OTHER PUBLICATIONS, line 17, delete "H20 Engineering," and insert --H2O Engineering,--.

First page, column 2, Item (56) OTHER PUBLICATIONS, line 18, delete "h20engineering.com" and insert --h2oengineering.com,--.

Second page, column 1, Item (56) OTHER PUBLICATIONS, line 1, delete "H20 Engineering," and insert --H2O Engineering,--.

Second page, column 1, Item (56) OTHER PUBLICATIONS, line 2, delete "h20engineering.com," and insert --h2oengineering.com,--.

Second page, column 2, Item (56) OTHER PUBLICATIONS, line 2, delete "www.h20engineering," and insert --www.h2oengineering.com,--.

In the CLAIMS:
Claim 1, column 43, line 32, delete "cooled" and insert --cooled,--.